US012175773B1

(12) United States Patent
Kaushik

(10) Patent No.: US 12,175,773 B1
(45) Date of Patent: Dec. 24, 2024

(54) EVENT ANALYSIS AND REVIEW TOOL

(71) Applicant: Samsara Inc., San Francisco, CA (US)

(72) Inventor: Suryakant Kaushik, Austin, TX (US)

(73) Assignee: Samsara Inc., San Francisco, CA (US)

( * ) Notice: Subject to any disclaimer, the term of this patent is extended or adjusted under 35 U.S.C. 154(b) by 0 days.

(21) Appl. No.: 18/670,365

(22) Filed: May 21, 2024

(51) Int. Cl.
    *G06V 20/59* (2022.01)
    *G06F 3/0482* (2013.01)
    *G06V 20/56* (2022.01)

(52) U.S. Cl.
    CPC .......... *G06V 20/597* (2022.01); *G06F 3/0482* (2013.01); *G06V 20/56* (2022.01)

(58) Field of Classification Search
None
See application file for complete search history.

(56) References Cited

U.S. PATENT DOCUMENTS

| 11,010,640 | B1* | 5/2021 | Daniels | G06V 10/454 |
| 11,352,013 | B1* | 6/2022 | Srinivasan | B60W 40/04 |
| 2023/0237897 | A1* | 7/2023 | Tang | G08B 29/18 |
| | | | | 382/103 |

* cited by examiner

*Primary Examiner* — Stuart D Bennett
(74) *Attorney, Agent, or Firm* — Schwegman Lundberg & Woessner, P.A.

(57) ABSTRACT

Techniques are presented to provide an event review dashboard. One method relates to a user interface (UI) for the event review dashboard that provides customers with a comprehensive view of their event engagement over time. The UI includes interactive elements, information fields, and filters to assist in the analysis and review of customer actions in response to behavioral events detected in vehicles. These actions may include coaching or dismissal. The UI provides filters for date range selection, customer selection, dismissal rate visualization, and minimum event thresholds, enabling customers to assess the relevance and effectiveness of specific event types and their coaching program performance. Additionally, the UI also includes a table and panel for detailed analysis of event dismissal by type and direct access to dismissed event details. The UI is designed for ease of use and efficient analysis, with feedback mechanisms to improve the AI model learning process.

14 Claims, 15 Drawing Sheets

FIG. 6

● AI EVENT DETECTION

AI DETECTION OF UNSAFE DRIVING BEHAVIORS, EVENTS IN SAFETY INBOX, AND CONFIGURABLE ALERTS. LEARN MORE

[CAMERA CALIBRATION SETTINGS]

● FOLLOWING DISTANCE DETECTION

ENABLES AI DETECTION OF TAILGATING OR UNSAFE FOLLOWING DISTANCES, SURFACES EVENTS IN SAFETY INBOX, AND ENABLES CONFIGURABLE ALERTS. BY DEFAULT, FOLLOWING DISTANCE WILL IMPACT THE DRIVERS' SAFETY SCORE.

IN-CAB AUDIO ALERTS: [OFF ▽] — 706     SPEED THRESHOLD: [35 MPH ▽]     DURATION: [15 SECONDS ▽] — 708     DISTANCE SECONDS: [1.5 SECONDS ▽] — 710

704

● FORWARD COLLISION WARNING

IN-CAB AUDIO ALERTS: [ON ▽] — 712

FIG. 7

SAFETY SETTINGS ☆ — 802

ⓘ SAFETY EVENT REVIEW CUSTOMERS HAVE RESTRICTED EVENT SETTINGS BY DEFAULT. CONTACT YOUR CUSTOMER SUCCESS REPRESENTATIVE TO INCREASE THE SENSITIVITY OF EVENT SETTINGS.

SAFETY SCORE   HARSH EVENTS   EVENT DETECTION   COACHING — 804

LOOKING FOR SOMETHING ELSE?
TO ENABLE DRIVER GAMIFICATION, VISIT DRIVER APP SETTINGS

EDIT INDIVIDUAL VEHICLES

VEHICLE TYPE — 805
DEFAULT VEHICLE TYPE (FOR NEWLY ADDED OR ACTIVATED VEHICLES)
[ HEAVY DUTY (MOST SENSITIVE) ▽ ] — 806

HARSH EVENT SENSITIVITY — 808
OUR RECOMMENDED SETTINGS IMPROVE THE RELEVANCE OF HARSH EVENTS YOU SEE IN THE SAFETY INBOX. USE THE DROPDOWN OPTIONS TO CHANGE THE SENSITIVITIES FOR EACH EVENT AND VEHICLE TYPE. SENSITIVITY LEVELS ARE SPECIFIC TO EACH VEHICLE TYPE.

LEARN MORE

|  | 🚗 PASSENGER — 816 | 🚙 LIGHT VEHICLE — 818 | 🚛 HEAVY VEHICLE — 820 |
|---|---|---|---|
| HARSH ACCELERATION — 810 | NORMAL ▽ | NORMAL ▽ | NORMAL ▽ |
| HARSH BRAKE — 812 | LOW (FEWER EVENTS) ▽ | LOW (FEWER EVENTS) ▽ | LOW (FEWER EVENTS) ▽ |
| HARSH TURN — 814 | LOW (FEWER EVENTS) ▽ | LOW (FEWER EVENTS) ▽ | LOW (FEWER EVENTS) ▽ |

USE RECOMMENDED SETTINGS

FIG. 8

EVENT ANALYSIS AND REVIEW TOOL

TECHNICAL FIELD

The subject matter disclosed herein generally relates to methods, systems, and machine-readable storage media for monitoring driving behaviors and improving road safety.

BACKGROUND

Various tools are available to provide users with information about specific events of interest. However, challenges arise when the volume of events becomes voluminous and overwhelming, making it difficult for the user to review them effectively. Additionally, the inclusion of events triggered by false alarms add unnecessary complexity and workload, as these events should not have been reported to ease the review burden on the user.

Accordingly, there is a pressing need for advanced tools designed to minimize the reporting of irrelevant or false alarm events. Such tools would not only facilitate a more manageable review process for the user but also enhance the overall accuracy of event reporting. This improvement is crucial for both users and tool providers aiming to optimize the effectiveness and reliability of their event monitoring systems.

BRIEF DESCRIPTION OF THE DRAWINGS

Various appended drawings illustrate examples of the present disclosure and cannot be considered limiting its scope.

FIG. 6 shows a UI for reviewing behavior events according to some examples.

FIG. 7 is a UI for configuring Following Distance (FD)-related parameters, according to some examples.

FIG. 8 is a UI for configuring harsh-event detection, according to some examples.

DETAILED DESCRIPTION

Figure 1:
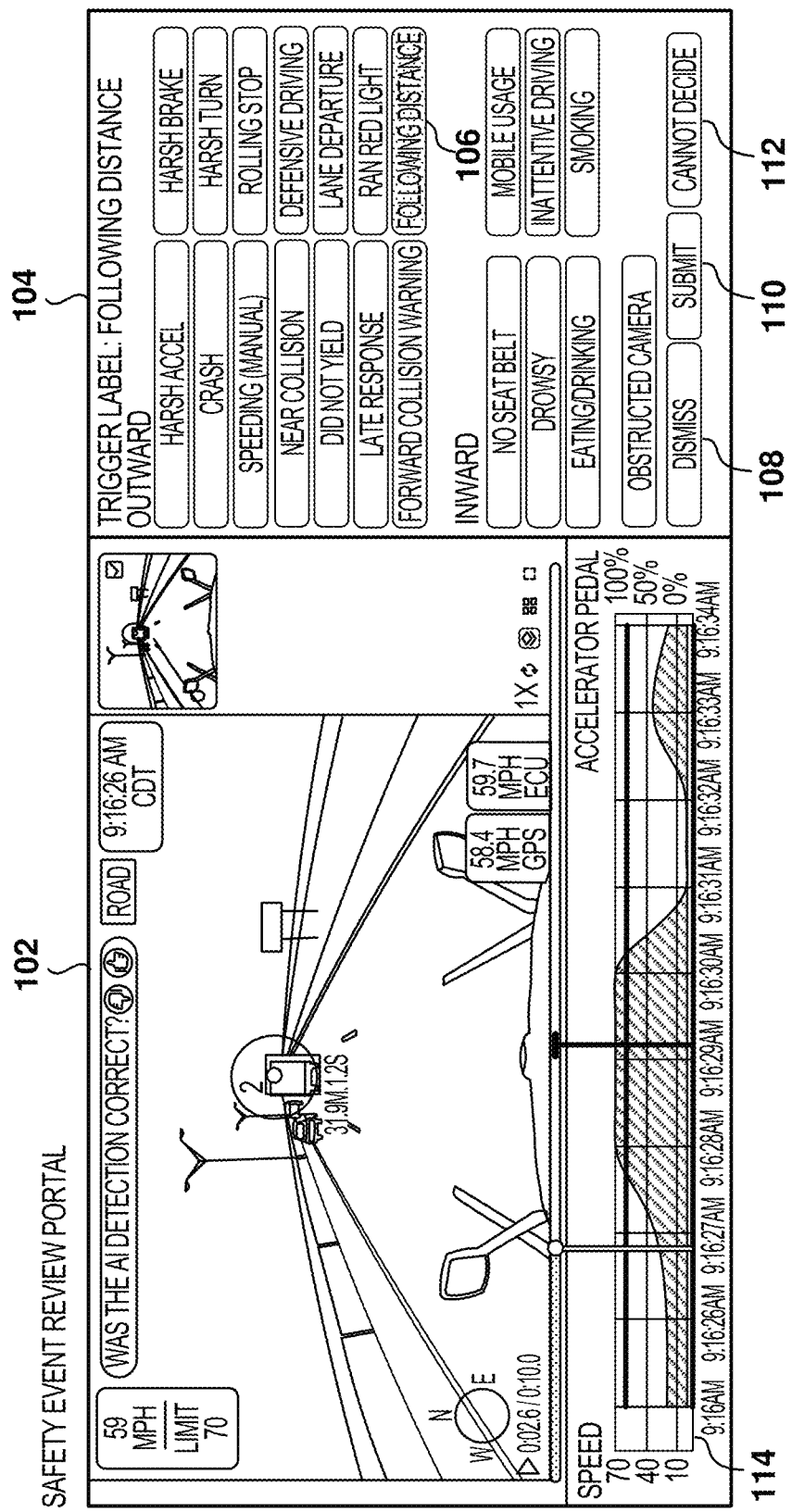
FIG. 1 is a user interface (UI) for annotating tailgating events, according to some examples.

Example methods, systems, and computer programs are directed to provide an event review dashboard that shows event dismissal information. Examples merely typify possible variations. Unless explicitly stated otherwise, components and functions are optional and may be combined or subdivided, and operations may vary in sequence or be combined or subdivided. In the following description, numerous specific details are set forth to provide a thorough understanding of examples. However, it will be evident to one skilled in the art that the present subject matter may be practiced without these specific details.

A Behavioral Monitoring System (BMS) sends event notifications to customers' inboxes when a Machine-Learning (ML) model executing on a vehicles onboard computing system detects a behavioral event (e.g., harsh breaking, distracted driving, following too close). For example, the ML model may be integrated into a telematics unit associated with the vehicle, which is equipped with various sensors including accelerometers, cameras, and Global Position System (GPS) modules. These sensors continuously collect data on operational parameters of the vehicle, and the driver's behavior.

The collected data is pre-processed to extract relevant features, such as sudden deceleration rates for harsh braking, or the time gap between vehicles for tailgating. This feature data is then fed into the ML model in real-time. The model, which has been previously trained on a large dataset of labeled driving behavior instances, uses this input to predict whether the current behavior constitutes a notable event based on learned patterns.

If an event is detected, the system packages the event data, including time stamps, sensor readings, and a confidence score from the ML model, and sends it to the BMS server. The server then processes these notifications and forwards them to the customer's inbox, often with recommendations for possible actions or alerts that can be reviewed by fleet managers or safety officers.

Administrators associated with the system can choose to keep an event pending or take action on it by assigning one of several coaching statuses (e.g., needs review, needs coaching, coached, reviewed, needs recognition, recognized, and dismissed). However, after reviewing the behavioral events, administrators do not have a way to view their drivers' performance across different event types and over a given time period.

The administrators lack comprehensive insights into the statuses spanning the different behavioral event types. This deficiency presents a significant challenge for administrators in determining whether there exists a discernible pattern or trend upon which they could proactively base their coaching program. For instance, should the administrators be dismissing an elevated quantity of harsh-brake events during a given month, there exists no mechanism for them to ascertain this information without undertaking a manual compilation and analysis of all pertinent events and their subsequent dismissals.

The absence of these insights constrains the customers' ability to develop highly effective coaching programs for their drivers and results in extra expenses for the service provider because the service provider has reviewers that perform a manual check on received events to validate the events for the customers. Thus, resources are wasted when reviewers spend time in the examination of certain events or event types that customers deem valueless.

An event review dashboard is introduced, which is a comprehensive resource that offers customers intelligent data regarding their dismissal metrics for each event type, as well as a historical account of the number of events they have actioned over a specified period. Within certain instances, the various coaching statuses are classified into three primary categories: not actioned, actioned, and dismissed. The event review dashboard furnishes detailed information segmented by event type to equip customers with a consolidated viewpoint, markedly improving decision-making capabilities and operational efficiency through a unified presentation of essential data.

Additionally, data regarding event review by administrators is collected and used to improve the training data of ML models that detect behavioral events in vehicles. For example, the improved training data includes false positives, which are events that were triggered by the ML model but should not have been triggered. For instance, consider a scenario where the ML model erroneously flags a harsh braking event as unsafe when, in reality, the braking was a necessary and safe response to a red traffic light. By incorporating these misclassified events into the training data, the ML models can be retrained to better differentiate between genuinely unsafe behaviors and contextually appropriate actions, thereby improving their accuracy and reliability in real-world driving situations.

FIG. 1 is a user interface (UI) for annotating tailgating events, according to some examples. FIG. 1 illustrates an exemplary user interface of a Safety Event Review Portal for monitoring and reviewing vehicle safety events. This UI is used by internal reviewers of the service provider to check if the events reported from the vehicle are proper events that should be passed on to the client or discarded to avoid sending events that should not have been triggered (e.g., a false positive of a following-too-close event where the driver was not following too close).

The interface is divided into three sections: a video playback area 102, an event timeline 114, and a trigger label panel 104. The video playback area 102 displays recorded footage of the vehicle's surroundings captured by onboard cameras. This area includes overlaid graphics, such as bounding boxes that indicate the detection of objects, such as the vehicle in front. Additional information, such as vehicle speed, is displayed alongside the video feed.

Below the video playback area is the event timeline 114, which provides a graphical representation of the vehicle's speed over time and highlights the duration of the safety event. The event timeline 114 includes a playback scrubber that allows users to navigate through the recorded event. By moving the position of the scrubber along the timeline, users can pinpoint and view specific moments in time within the video. The data presented within the event timeline 114, such as vehicle speed or other telematics, corresponds directly to the content being displayed in the video at that particular moment.

The trigger label panel 104 is organized into three sections, each with interactive elements for categorizing the nature of the safety event. The first section includes outward-facing events such as harsh acceleration, crash, and following distance 106. The second section lists inward-facing events that may involve the driver, including, but not limited to: no seat belt usage, drowsiness, and mobile usage.

The third section contains action buttons for categorizing the event. The action buttons include a dismiss button 108, a submit button 110, and a cannot decide button 112. The dismiss button 108 is for dismissing the event because the review showed that the respective event did not really happen (e.g., the driver was not following too closely. This dismissal is referred to herein as a false positive. The submit button 110 is to confirm that the event happened, referred to herein as a true positive.

Upon dismissal of the event, the corresponding dismissed event shall not be displayed to the end user. This procedure conserves the end-user's time by eliminating the need to examine false positives. Conversely, if the event is not dismissed after review, it is then reported to the end user. This selective reporting mechanism enhances the efficiency of the review process, ensuring that only relevant and verified events require the end user's attention.

In some examples, an ML model is used at the vehicle to identify FD events, which are events where the driver is following too closely, based on images captured by the forward-facing camera in the vehicle. However, the accuracy of the ML model may be improved to reduce the number of false positives and increase the number of false negatives to make sure all the FD events are flagged for review.

To improve the accuracy of the ML model and reduce the number of false positives, techniques are presented to collect information from reviewers in order to get better estimates of the following distance (FD) and capture this information to improve the training set for the ML model. Also, review information from the end users can be used to improve the accuracy of the ML model based on the categorizing of events by the end user.

Figure 2:
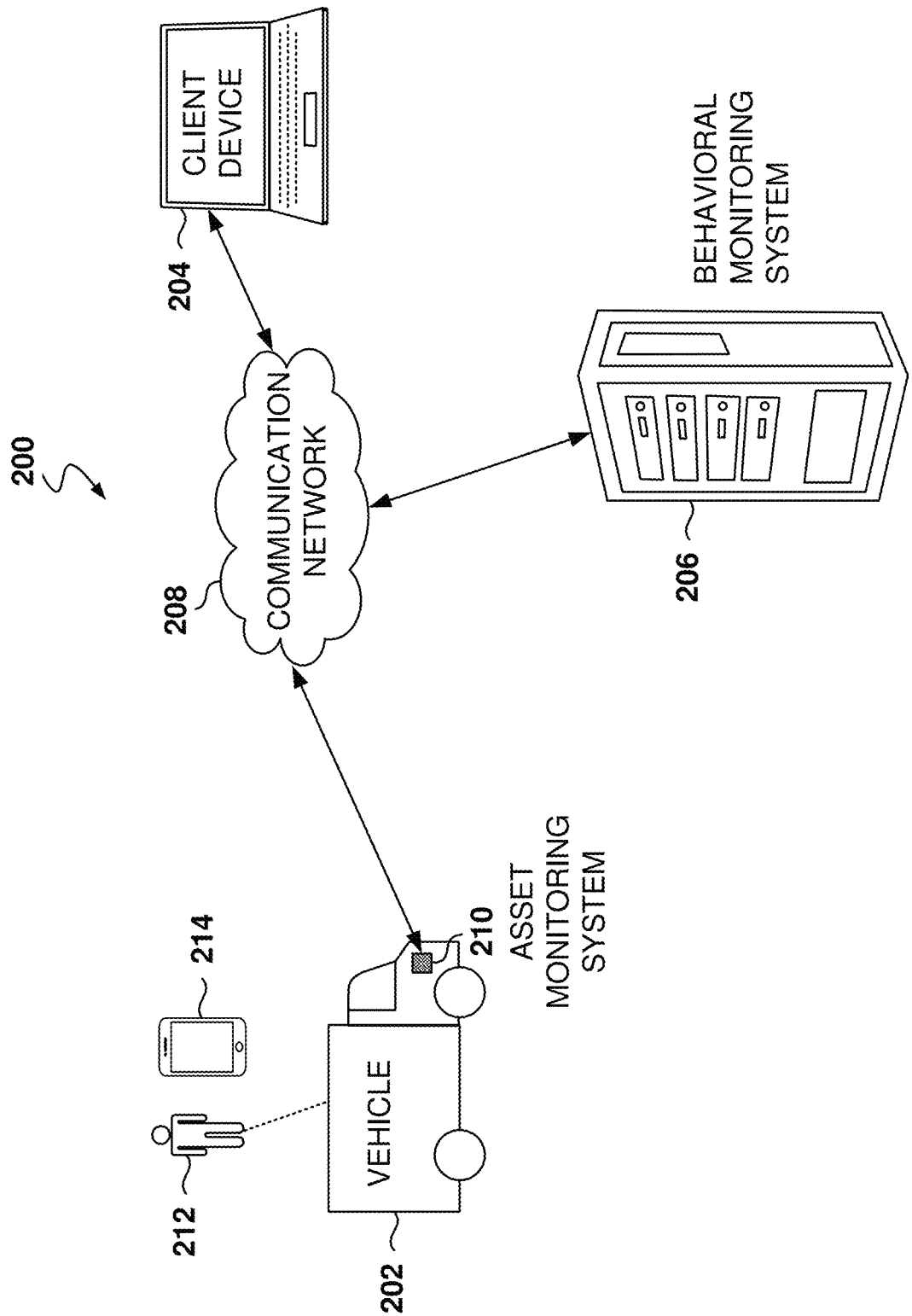
FIG. 2 shows a system for vehicle rider behavioral monitoring, according to some examples.

FIG. 2 shows a system 200 for vehicle rider behavioral monitoring, according to some examples. As shown, multiple devices (e.g., vehicle 202, client device 204, and behavioral monitoring system 206) are connected to a communication network 208 and configured to communicate with each other through the communication network 208. The communication network 208 is any type of network, including a local area network (LAN), such as an intranet, a wide area network (WAN), such as the internet, a mobile telephone network, a satellite communications network, or any combination thereof.

According to some examples, the vehicle 202 may be any type of vehicle or combination vehicle, such as an automobile, semi-trailer truck, trailer, plane, train, ship, and the like. Further, the techniques presented herein may be used with other non-moving assets that are operated by an operator (e.g., cranes, manufacturing equipment, call centers) and assets that are controlled remotely (e.g., drones, air traffic controllers). The examples described herein should therefore not be interpreted to be exclusive or limiting, but rather illustrative.

As shown, the vehicle 202 includes an asset monitoring system (AMS) 210 that allows for monitoring events at the vehicle and exchanging information and commands between the vehicle 202 and one or more remote computing devices via the communication network 208.

The asset monitoring system 210 allows the vehicle 202 to transmit data, such as sensor data gathered by sensors in the vehicle 202, to a remote computing device. The vehicle 202 may be equipped with a variety of sensors that capture data describing the performance of the vehicle 202, actions performed by riders in and around the vehicle 202, and the vehicle's surrounding environment.

The behavioral monitoring system 206 is a computing system consisting of one or more computing devices configured to provide remote behavioral monitoring of a vehicle 202 to detect different conditions of driver state and execute corresponding responses. For example, the behavioral monitoring system 206 may allow a user, such as a fleet manager administrator, to define a set of triggering conditions and criteria for detecting and responding to undesirable behavior or dangerous conditions.

Users (e.g., administrators and fleet managers) may use the client device 204 to utilize the behavioral monitoring system 206's functionality. Further, the behavioral monitoring system 206 may concurrently accept communications from and initiate communication messages, interact with any number of client devices 204 and vehicles 202, and support connections from a variety of different types of client devices 204.

According to some examples, a user interacts with the behavioral monitoring system 206 via a client-side application installed on the client device 204. In some examples, the client-side application includes a component specific to the behavioral monitoring system 206. For example, the component may be a stand-alone application, one or more application plug-ins, or a browser extension. However, the users may also interact with the behavioral monitoring system 206 via a third-party application, such as a web browser or messaging application, that resides on the client device 204 and is configured to communicate with the behavioral monitoring system 206. In either case, the client-side application presents a user interface (UI) for the user to interact with the behavioral monitoring system 206.

The user interface also enables administrators to define corresponding actions to be performed when a triggering condition has been satisfied/triggered. For example, the user interface enables the administrator to define contact identifiers (e.g., email addresses, phone numbers, etc.) to which notifications are to be sent.

Further, a driver 212 may interact with the behavioral monitoring system 206 and the AMS 210 via a mobile device 214. A BMS app may execute on the mobile device 214 and connect (e.g., via wireless communication such as cellular, WiFi, or Bluetooth) to the AMS 210 and the behavioral monitoring system 206 to perform operations related to the BMS, such as getting information for a trip, receiving feedback regarding in-vehicle behavior, attend training, etc. Alternatively, the driver 212 may access the same functionality via a web browser executing on the mobile device 214.

Figure 3:
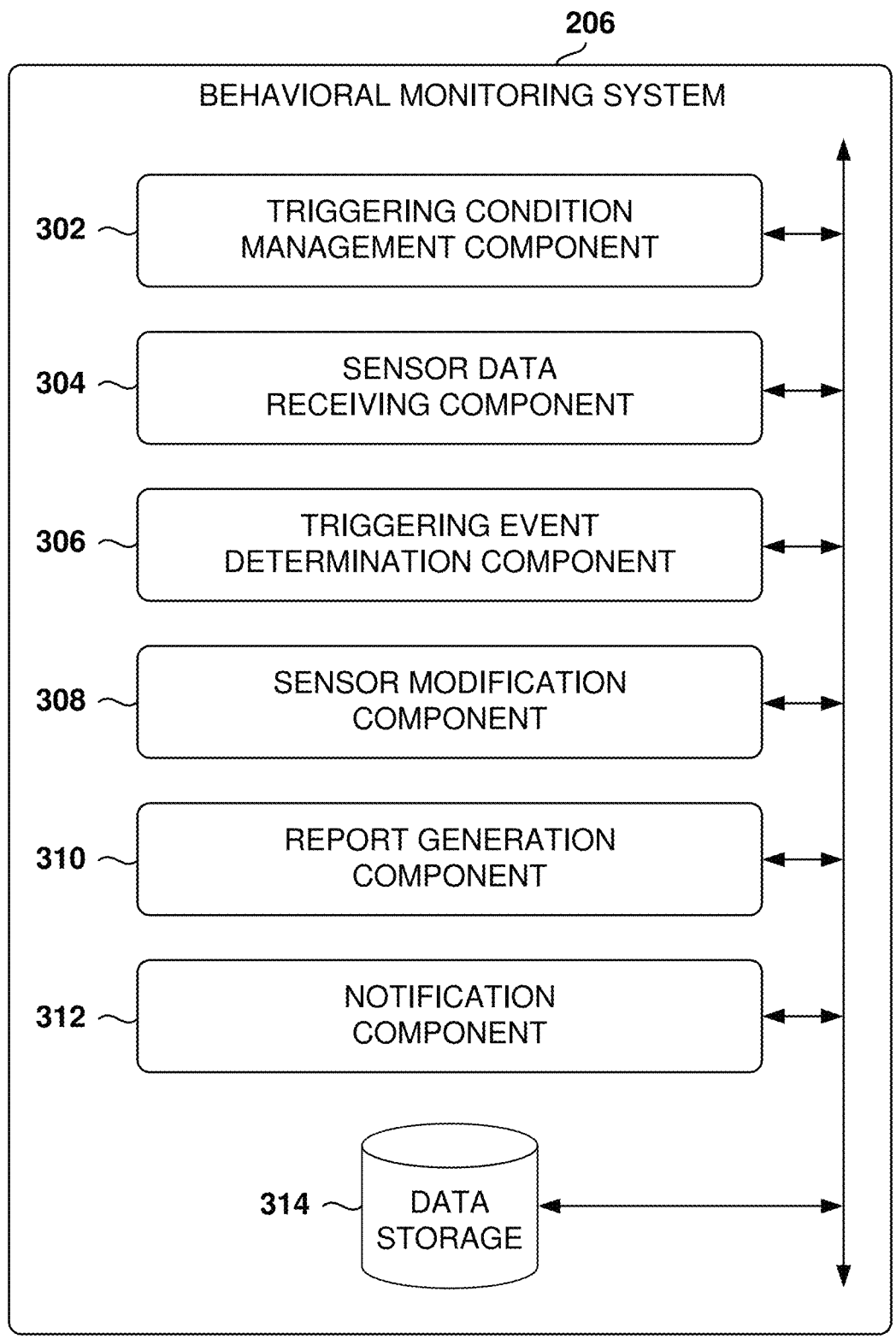
FIG. 3 is a block diagram of a Behavioral Monitoring System (BMS), according to some examples.

FIG. 3 is a block diagram of a behavioral monitoring system 206 (BMS), according to some examples. The various functional components depicted in FIG. 3 may reside on a single computing device or may be distributed across several computing devices in various arrangements, such as those used in cloud-based architectures.

The behavioral monitoring system 206 includes a triggering condition management component 302, a sensor data receiving component 304, a triggering event determination component 306, a sensor modification component 308, a report-generation component 310, a notification component 312, and a data storage 314.

The triggering condition management component 302 facilitates the generation and modification of triggering conditions. For example, triggering condition management component 302 provides a graphical user interface that allows administrators to generate and modify triggering conditions. Each triggering condition defines one or more individual conditions that, if satisfied, indicates the occurrence of an undesirable behavior, as well as a corresponding set of response actions to be performed if the triggering condition has been satisfied. The user interface provided by the triggering condition management component 302 enables administrators to define the triggering conditions. Triggering conditions may include any one or combination of specific criteria or parameters that, when met or surpassed, prompts a predetermined or user-defined response within the system. For example, such conditions can include: thresholds; the detection of image features from camera feeds; anomalies in sensor data, such as irregular steering or braking patterns; behavioral patterns, including, for example, a lack of interaction with vehicle controls or infrequent checks of mirrors; as well as the presence of certain environmental factors like the time of day, adverse weather conditions, or high traffic density.

Similarly, an administrator may use the user interface elements to define corresponding actions to be performed in the event that a triggering condition has been triggered. In some examples, the triggering condition management component 302 stores the generated triggering conditions in the data storage 314. The stored triggering conditions may be associated with an account and fleet identifier that identifies the account, vehicle fleet, or vehicles to which the triggering conditions are associated.

The sensor data receiving component 304 receives sensor data from the vehicles 202, including data from the sensors in the AMS 210. The sensor data receiving component 304 provides the sensor data to the other components of the behavioral monitoring system 206 for use in detecting the occurrence of undesirable behavior. The sensor data receiving component 304 may also store the sensor data in the data storage 314, where it may be accessed by the other components of the behavioral monitoring system 206. For example, the stored sensor data may be associated with a unique identifier associated with the vehicle 202 from which the sensor data was received. The sensor data may also include timestamp data indicating the time at which the sensor data was captured by the sensors of the vehicle 202 or when the sensor data was received by the behavioral monitoring system 206.

The triggering event determination component 306 uses the sensor data received by the sensor data receiving component 304 to determine whether any of the triggering conditions have been satisfied. In some examples, a triggering condition may be based on one or more of a combination of individual conditions, such as a combination of detecting specified terms, detecting specified motions, or detecting a specified volume level. In these types of examples, the triggering event determination component 306 may use the sensor data to determine that each of the individual conditions has been satisfied within a predetermined time window, such as within a five-second window. For example, the triggering event determination component 306 may use timestamp data associated with the sensor data to determine whether each of the individual conditions was satisfied within the predetermined time window. Accordingly, the triggering condition is satisfied when each of the individual conditions is detected within the predetermined time window.

The triggering event determination component 306 notifies the other components of the behavioral monitoring system 206 if a triggering condition has been triggered.

The sensor modification component 308 modifies the operating mode of sensors in the vehicle 202. In some cases, an administrator or fleet manager may wish to capture additional or higher-quality sensor data to document a detected incident of undesirable behavior. For example, the administrator or fleet manager may wish to initiate the use of sensors, such as cameras, microphones, or other sensor devices, to capture sensor data and document the incident.

The report-generation component 310 generates an incident report to document a detected occurrence of undesirable behavior. The incident report may include any of a variety of data defined by an administrator in a triggering condition. For example, an incident report may include data identifying the vehicle 202, the driver of the vehicle, the time of the incident, the action that satisfied the triggering condition (e.g., lane departure, driving while drowsy, etc.), as well as captured sensor data depicting the incident. The report-generation component 310 may store the incident report in the data storage 314, where an administrator or other authorized user may access it.

The notification component 312 generates and transmits a notification to users defined by the triggering condition. For example, the notification component 312 identifies a contact identifier corresponding to the triggering event. An administrator may define the contact identifier when generating the triggering event. The contact identifier provides contact details for reaching a user designated to receive a notification when the triggering event is triggered. For example, the contact identifier may be an email address, phone number, and the like.

The notification component 312 may then transmit a notification directed to the content identifier. The notification may provide details of the detected incident, such as a description of the undesirable behavior, time, associated vehicle 202, and the like. The notification may also enable a user to access an incident report associated with the detected incident.

Figure 4:
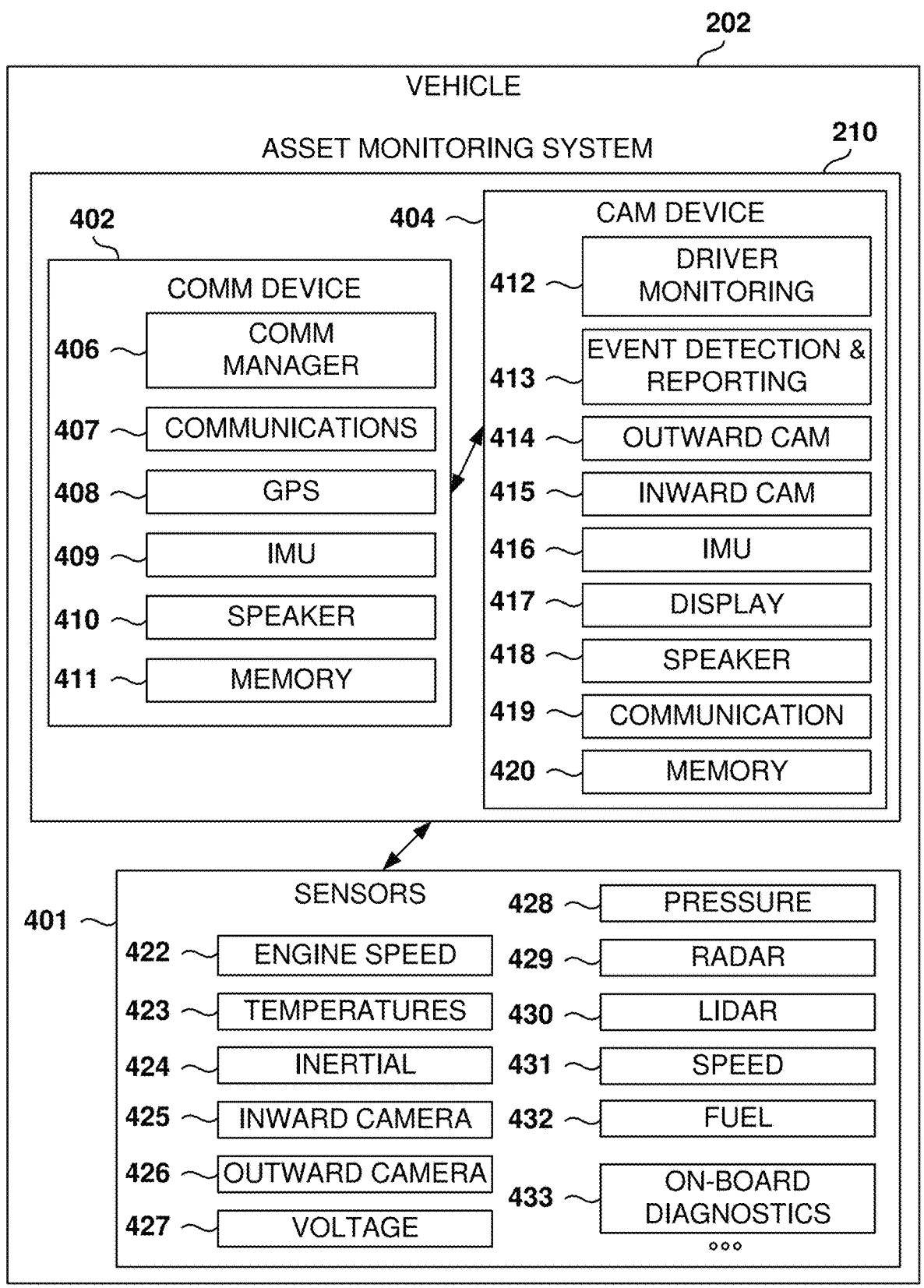
FIG. 4 illustrates the components of a vehicle for rider behavioral monitoring, according to some examples.

FIG. 4 illustrates components of a vehicle 202 for rider behavioral monitoring, according to some examples. The vehicle 202 includes the asset monitoring system 210 and a plurality of sensors 401. The AMS 210 may include a single device or distribute its functions across a plurality of devices in the vehicle (e.g., sensors, processors, communications devices) that are able to communicate among themselves. In the illustrated example, the AMS 210 includes a comm device 402 and a cam device 404, but other examples may utilize different numbers of devices or distribute their functionality differently.

The comm device 402 provides communication services within the vehicle and the network and may connect to the diagnostic port in the vehicle to gather vehicle information. In some examples, the comm device 402 includes a communications manager 406, a communications module 407, a Global Positioning System (GPS) 408, Inertial Measurement Unit (IMU) 409, a speaker 410, computer memory 411 (RAM and permanent storage), and one or more processors (not shown). The GPS 408 and the IMU 409 may be used, together or separately, to calculate the speed of the vehicle.

The communications manager 406 coordinates communications with the BMS and other devices in the vehicle, such as the cam device 404. The communications module 407 provides one or more communication interfaces, such as mobile telephony, satellite communications, WiFi, Bluetooth, etc. Further, the communications manager 406 may provide a WiFi hotspot to other devices in the vehicle so these devices can communicate to the network via the WiFi hotspot.

The IMU 409 sensor detects the motion and orientation of the vehicle, and the memory 411 stores data collected during the operation of the vehicle and programs that may be executed on the comm device 402.

In some examples, the cam device 404 includes a driver monitoring 412 module, an event detection and reporting system 413, an outward camera 414 that captures images in the direction of travel, an inward camera 415 that captures images of the vehicle cabin, an IMU 416, a display 417 (e.g., a touchscreen, computer display, LED lights), a speaker 418, a communications module 419, a memory 420, and a processor (not shown). The inward camera 415 is installed within the vehicle cabin to monitor the driver and passengers, while the outward camera 414 provides visual information about the environment surrounding the vehicle.

The driver monitoring 412 module performs one or more activities regarding driver behavior, such as LD detection, driving while drowsy, following too close, sudden breaking, etc. The event detection and reporting system 413 is configured to identify and log significant events based on sensor data. The display 417 provides visual feedback and information to the vehicle occupants, while the speaker 418 provides auditory information or alerts. Further, the memory 420 stores data collected during the operation of the vehicle and programs that may be executed on the cam device 404.

In some examples, the cam device 404 is configured to execute the machine learning models described below, but other examples may execute the machine learning models in the comm device 402. Other configurations may include additional devices within the AMS 210 or consolidate all functions within a single device.

In some examples, the comm device 402 and the cam device 404 are connected via a hardwire connection (e.g., USB), and the cam device 404 may be powered via this hardwire connection. In some examples, the comm device 402 draws power from the vehicle's electrical system. Further, the AMS may include other sensors, such as any of the sensors 401. The AMS 210 is configured to communicate with any of the sensors 401 in the vehicle.

The sensors 401 are configured to monitor various parameters and states of the vehicle. In some examples, the sensors 401 include an engine speed sensor 422 that measures the revolutions per minute of the engine, temperature sensors 423 that measure various temperature points in the vehicle (e.g., cabin, engine, outside), and inertial sensors 424 that detect motion and orientation of the vehicle. The sensors 401 may also include an inward camera 425, an outward camera 426, a voltage sensor 427 that monitors the electrical system of the vehicle, and pressure sensors 428, which detect the pressure in various systems such as tires or hydraulic systems. Further, the sensors 401 may include radar sensors 429 and Light Detection and Ranging (LIDAR) sensors 430, which provide distance and mapping capabilities for the vehicle's surroundings. A speed sensor 431 measures the traveling speed of the vehicle, and fuel sensors 432 monitor the amount of fuel in the tank. The vehicle may also include an on-board diagnostics system 433 for self-diagnosis and reporting of the operational status of the vehicle 202.

Figure 5:
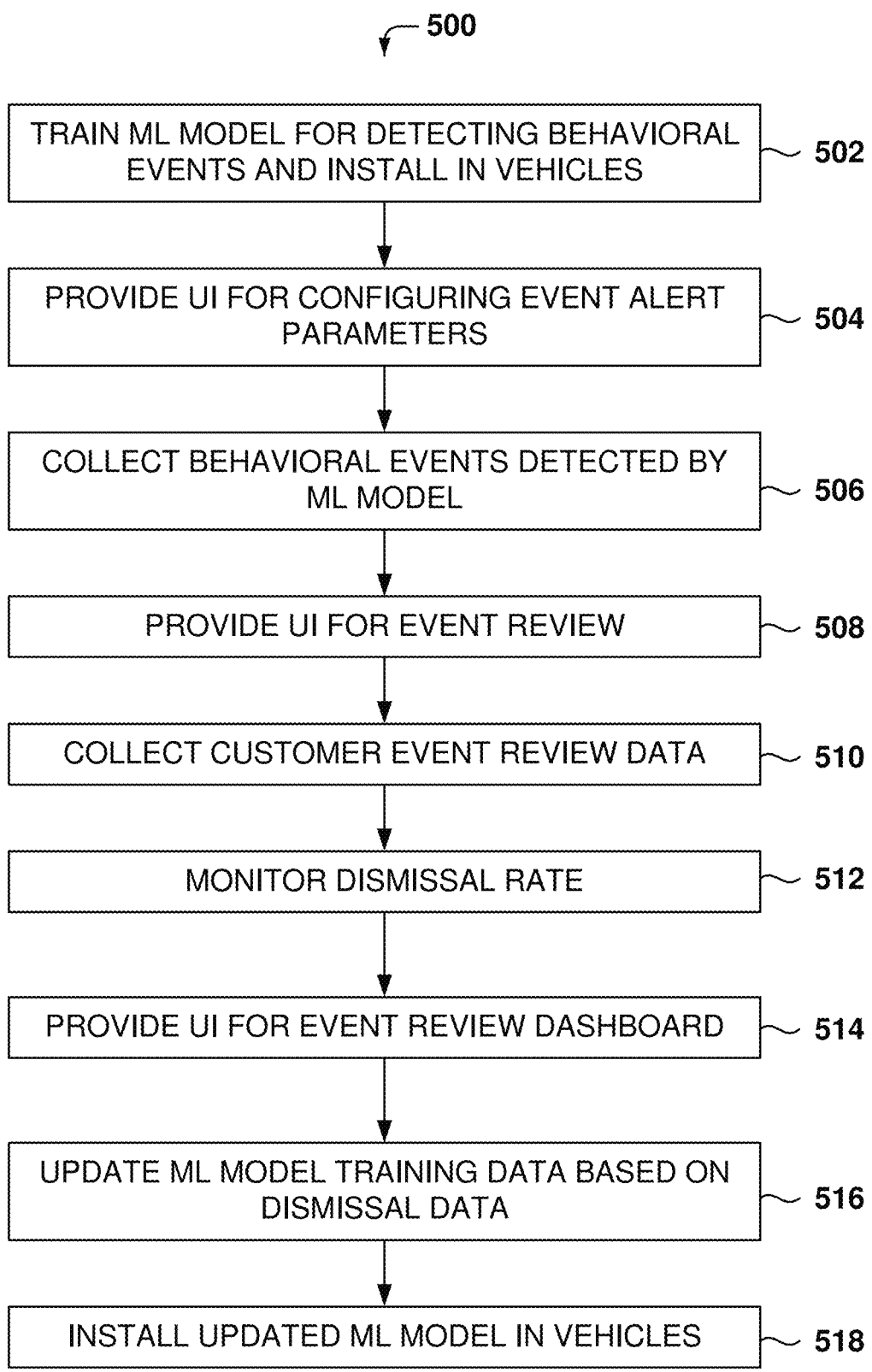
FIG. 5 is a flowchart of a method for improving a machine learning (ML) model for behavioral event detection, according to some examples.

FIG. 5 is a flowchart of a method 500 for improving a machine learning (ML) model for behavioral event detection, according to some examples. While the various operations in this flowchart are presented and described sequentially, one of ordinary skill will appreciate that some or all of the operations may be executed in a different order, be combined or omitted, or be executed in parallel.

Operation 502 involves training the ML model to detect behavioral events and installing the ML model in vehicles. From operation 502, the method 500 flows to operation 504 for providing a UI to configure event alert parameters. This operation allows users to customize the criteria under which they will receive alerts, tailoring the system to their specific needs. This UI allows individual adjustments at the customer level, vehicle level, and event type.

Operation 506 is the collection of behavioral events detected by the ML model. Next, operation 508 offers a UI for event review (e.g., the UI presented in FIG. 1), enabling users to examine and evaluate the events that the model has detected.

From operation 508, the method 500 flows to operation 510, which involves collecting customer event review data. This data reflects how users classify the received events, such as actual behavioral events that require coaching or false positives that do not correspond to undesired behavior.

The event review data includes service provider analysis of events, the customer classification of the events, feedback data on video interactions, coaching statuses, event types, and customer actions.

Monitoring the dismissal rate is performed at operation 512, which tracks how frequently users dismiss the alerts, which is an indicator of the relevance and accuracy of the ML model's detections.

From operation 512, the method 500 flows to operation 514 to provide a UI for the event review dashboard. This interface presents users with an overview of their dismissal activity by type of behavioral event, allowing them to monitor and analyze how events are being processed. The UI includes filters for selecting which event data to analyze. Examples of filters include start date, end date, customer selection, and event type categorization.

In operation 516, the ML model's training data is updated based on the dismissal data. Thus, user feedback is used to improve the ML model's accuracy and relevance.

From operation 516, the method 500 flows to operation 518, which involves installing the updated ML model in vehicles. This operation completes the cycle, deploying the enhanced model back into the field for continued use and further data collection.

The logic behind method 500 is to create a feedback loop in which the ML model is continuously improved based on user interaction and feedback.

The methodology presented provides several benefits, such as AI model improvement and cost savings. Utilizing customer insights through the event review dashboard allows the service provider to better train ML models and improve the accuracy of predicting coachable events from the customer's standpoint. This will translate into improved customer satisfaction by reducing the review load on fleet administrators.

Further, cost savings may be achieved by identifying certain event types or adjustments of customers' settings sensitivity based on customer insights to reduce the number of events to review and save operations costs.

Figure 6:
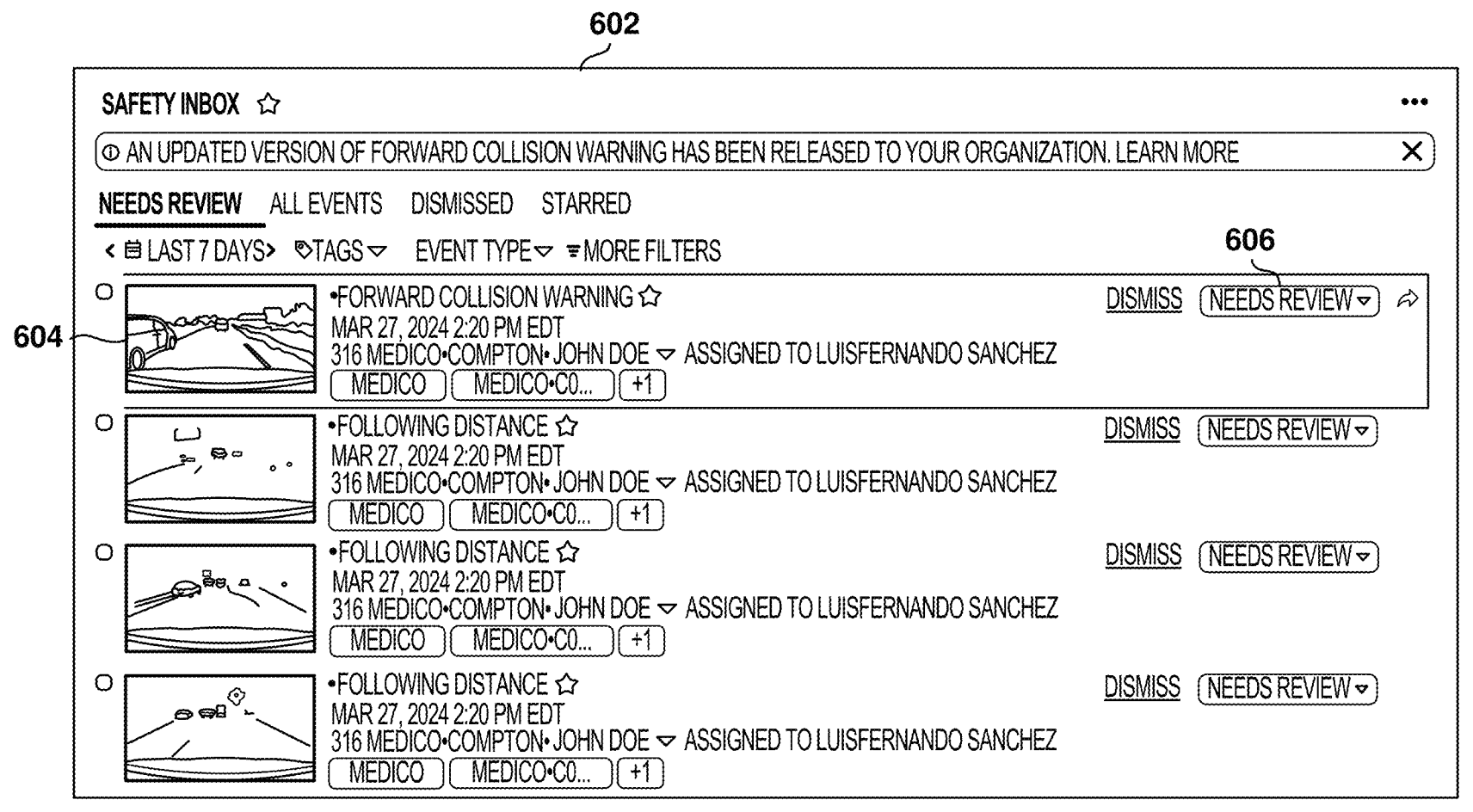

FIG. 6 shows a UI 602 for reviewing behavior events according to some examples. The UI 602 is for a Safety Inbox that includes the events received by the BMS for the administrator's review. The UI 602 includes a header section at the top indicating the title "Safety Inbox." Below the title, in the illustrated example, a notification bar provides an update message regarding a feature related to Forward Collision Warning, with an option for the user to learn more about the update.

The main portion of the interface displays a list of events 604 for review. Each event 604 is represented by a row containing a thumbnail image, event information, and associated metadata. The events can be further organized by various filters such as "All Events," "Dismissed," and "Starred." Additional filtering options are available, including "Last 7 Days," "Tags," "Event Type," and "More Filters."

A drop-down menu 606 provides multiple options to take based on the event, such as needs review, needs coaching, needs recognition, coached, reviewed, recognized, and dismissed.

Each event 604 entry includes a label such as "Forward Collision Warning," indicating the type of event, a timestamp indicating the date and time of the event, and the name of an individual associated with the event.

The UI 602 provides interactive elements such as buttons to dismiss an event or mark it as needing review. Navigation controls for sorting and searching through events, as well as pagination controls, are located at the top right of the list area.

The design of the UI 602 aims to facilitate the monitoring and management of safety-related events within an organizational context, allowing for efficient review and action by administrators responsible for safety oversight. If an event 604 is selected, a page for a detailed review of the event is presented, such as the one illustrated in FIG. 1.

FIG. 7 is a UI 702 for configuring FD-related parameters, according to some examples. The UI 702 includes a section for AI event detection that provides options for FD detection, forward collision warning, and in-cab audio alerts 712. When enabled, AI event detection allows the monitoring of events associated with the vehicle and the driver, such as the options presented in FIG. 1, including the FD events.

The FD detection setting enables automatic detection of tailgating or unsafe following distances. The BMS will surface detected FD events in the customer's safety inbox. A note also indicates that FD events will impact the driver's safety score.

The FD-detection options include turning in-cab audio alerts 704 on or off, setting a speed threshold 706 for when the FD detection should be active, specifying the minimum duration 708 for which the behavior must be observed to trigger an alert, and setting the distance 710 in seconds that defines the minimum safe FD. The parameters configured with UI 702 are then used to configure the rules to determine when an FD event is safe or unsafe, as discussed above.

Another safety feature that can be configured in this interface is the forward collision warning, which allows the user to turn on or off in-cab audio alerts for forward collision warnings.

FIG. 8 is a UI 802 for configuring harsh-event detection, according to some examples. The UI 802 is another example of how users can configure the monitoring of behavioral events. The typical goal of the administrator is to receive notification of important events while discarding non-important events that would create additional work for review. By monitoring how customers configure their notifications, the BMS can learn about the relative importance of events for monitoring and reporting.

The UI 802 includes a variety of interactive elements designed to allow a user to customize the sensitivity and parameters for detecting harsh driving events. At the top of the UI 802, a title (e.g., Safety Settings) is provided with a notification bar that provides important information or alerts to the user.

Below the notification bar, a tabbed navigation menu 804 allows the user to switch between different settings categories, such as 'Safety Score,' 'Harsh Events' (the one selected in this example), 'Event Detection,' and 'Coaching.'

The UI 802 provides several options for configuring harsh events, including vehicle type 805 and harsh event sensitivity 808. The vehicle type 805 section allows the user to select the vehicle type for which the harsh-event detection settings will be applied and includes a dropdown menu 806 to select the type of vehicle, such as a car, light truck, tractor-trailer, heavy-duty, medium-duty truck, etc.

The harsh event sensitivity 808 section is for configuring parameters for harsh-event monitoring and includes several configuration options disposed on a three-by-three matrix. The three rows are for different types of harsh events, including harsh acceleration 810, harsh brake 812, and harsh turn 814.

The three columns are for different types of vehicles, including passenger 816, light vehicle 818, and heavy-duty 820. For each combination of harsh event and vehicle type, a drop-down menu allows the user to configure the sensitivity, such as normal, low, or high.

These dropdown menus allow the user to independently adjust the sensitivity for detecting harsh acceleration, braking, and turning events based on the vehicle's occupancy type. The options within the dropdown menus range from low sensitivity (indicating fewer events will be detected) to high sensitivity (indicating more events will be detected).

The interface is designed with a clean and intuitive layout, with clear labels and easy-to-navigate dropdown menus. The overall design of the interface aims to provide a user-friendly experience for configuring harsh-event detection settings to enhance vehicle safety and driver awareness.

In the case of encountering harsh events, it can be very beneficial to analyze them carefully as they represent significant challenges. Certain customers provided feedback that it is difficult to configure harsh events properly. For example, despite the sensitivity being set at a very low level, there may be another underlying issue at play that can trigger a high number of events, such as a heavy-duty truck, which is the most sensitive type of vehicle. This occurrence is considered a natural consequence of the vehicle's weight and sensitivity settings. If the BMS detects a relatively high frequency of these types of events, the BMS may recommend, for example, adjusting the sensitivity to a lighter-duty setting to potentially reduce the frequency of these events.

Figure 9:
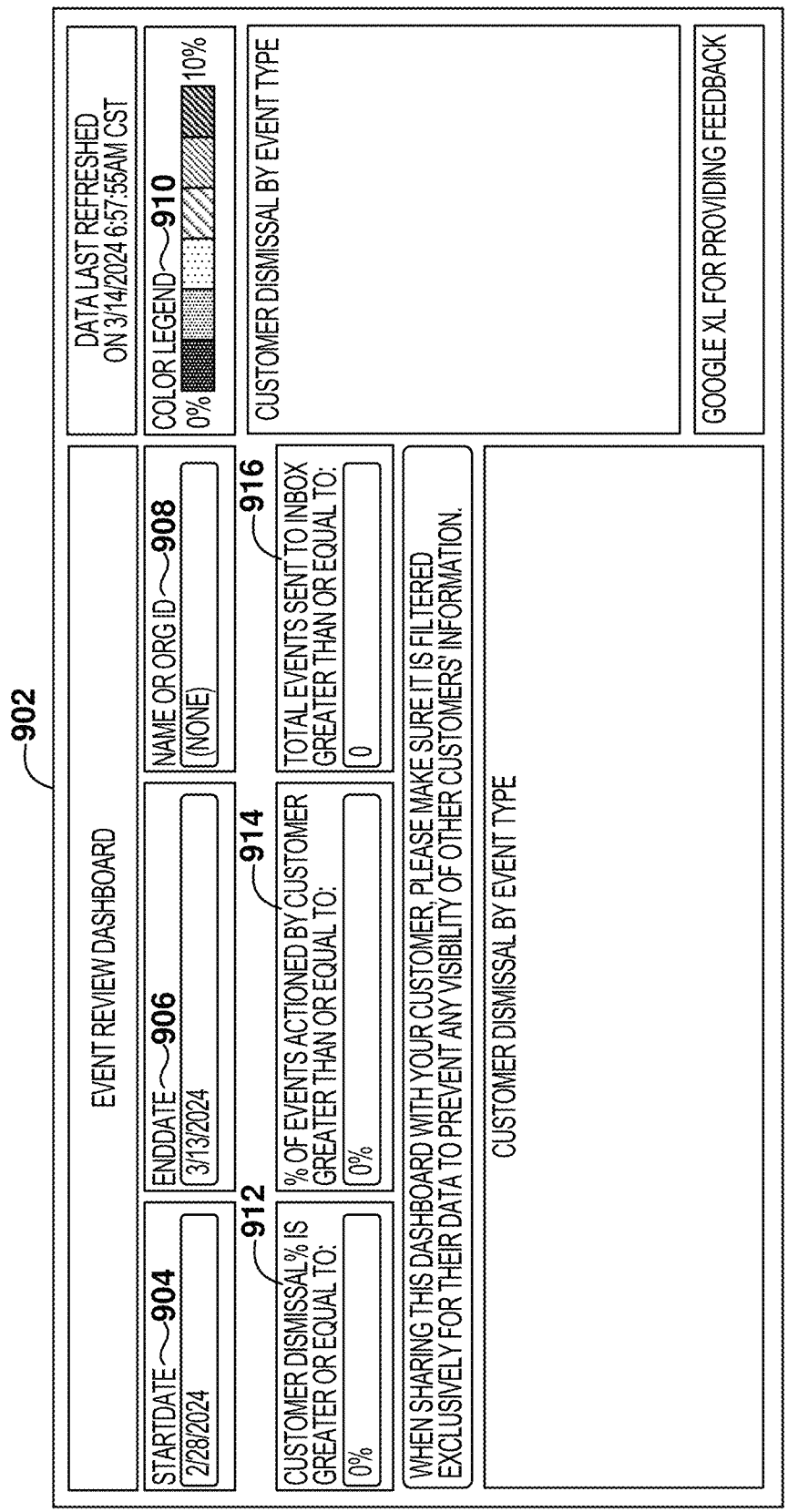
FIG. 9 is a UI for an event review dashboard, according to some examples.

FIG. 9 is a UI 902 for an event review dashboard, according to some examples. The UI 902 includes a header section with the title "Event Review Dashboard." Below the header, there are multiple interactive elements and information fields.

Typically, customers address one event at a time and lack a comprehensive overview of their actions over time (e.g., a quarter). The UI 902 provides customers with a holistic view of their event engagement, including actions taken such as coaching, dismissal, or other responses. For example, this dashboard will inform customers about the effectiveness of their coaching program, indicating whether coaching and training goals are being met. By offering insights into their coaching program performance, customers can enhance their overall program effectiveness.

Customers can also assess the relevance of specific event types, such as "rolling stop" or "seatbelt," especially if these events are not applicable to their operations (e.g., trucks driven only in a yard). By analyzing customer dismissals and actions on event types over a defined period, the BMS can identify low engagement levels and show them in the dashboard. This data can be used to trigger adjustments in the AI event-detection algorithms to prevent sending irrelevant event videos to customers, thereby optimizing the content delivery process.

Several filters in the UI 902 may be used to determine the selected videos. To the left of the interface, there are two filters for date range selection, including the start-date filter 904, which allows users to specify the start date for the events they wish to review, and the end-date filter 906 to specify the end date for the events to be reviewed.

To the right, there is a dropdown menu 908 labeled "Name or Org ID," which is a filter to select a customer from a list of customers for selecting events. Next to this dropdown menu, there is a color-coded status indicator 910 that visually represents the level of dismissal, measured by the percentage of dismissals, with red representing high dismissal rates and green indicating low dismissal rates. A dismissal is a customer action to dismiss an event sent to their inbox.

Below, another filter 912 for customer dismissal percentage is provided. The user is able to enter a percentage number, and the event types with a dismissal rate above this value will be selected. This allows the user to filter out events with low dismissal rates because these events seem to be triggered appropriately, given the low dismissal rate. Since these events are properly triggered, there will be no motivation to tune these types of events further. Of course, the user may enter a low value for the percentage rate, even zero percent, to further improve triggering factors, even for events that are triggered correctly most of the time.

This filter aims to identify instances where the dismissal rate is notably high, e.g., exceeding 50%. Such a high dismissal rate indicates that a significant portion of events have been processed by agents and deemed unsuitable for coaching. In contrast, a low dismissal rate is expected, as events are typically used for coaching purposes. In some examples, the BMS offers several status options for events, including dismiss, coach, recognize, and pending. Dismissal, in this context, signifies the decision not to provide coaching for a specific event to drivers, resulting in the customer dismissal percentage.

Next, another filter 914 is provided with the label "percentage of events action by customer greater than or equal to." The user can enter a percentage value to select events that show a higher percentage of actions by the administrator.

To the right, another filter 916 is provided with the label "Total events sent to inbox greater than or equal to". The user is able to enter the minimum number of events that have been sent to the safety inbox. The filter 916 determines the volume of events to be displayed. For instance, if only a single event is dismissed, it may not provide significant value. Therefore, users can set a minimum threshold, such as a hundred events, to display customers with that specific number of events.

In some examples, the UI 902 is used by service provider customer agents to discuss information with an end user. The dashboard may also be used by Customer Success Managers (CSMs) during their periodic (e.g., bi-weekly) meetings with customers to share updates.

In some examples, the dashboard is designed to ensure that customer data remains confidential and is not accessible by individual Customer Success Managers (CSMs). Each CSM is granted a default restricted access level. A message is provided in the UI 902 to warn the customer agent, "When sharing this dashboard with your customer, please make sure it is filtered exclusively for their data to prevent any disability of other customers' information."

In other examples, the UI 902 is provided to customers. In this case, the UI 902 will allow the selection of only the organization ID or IDs associated with the customer. Once the filters are set, the information is presented at the bottom of the interface, as discussed in more detail below with reference to FIG. 10.

Figure 10:
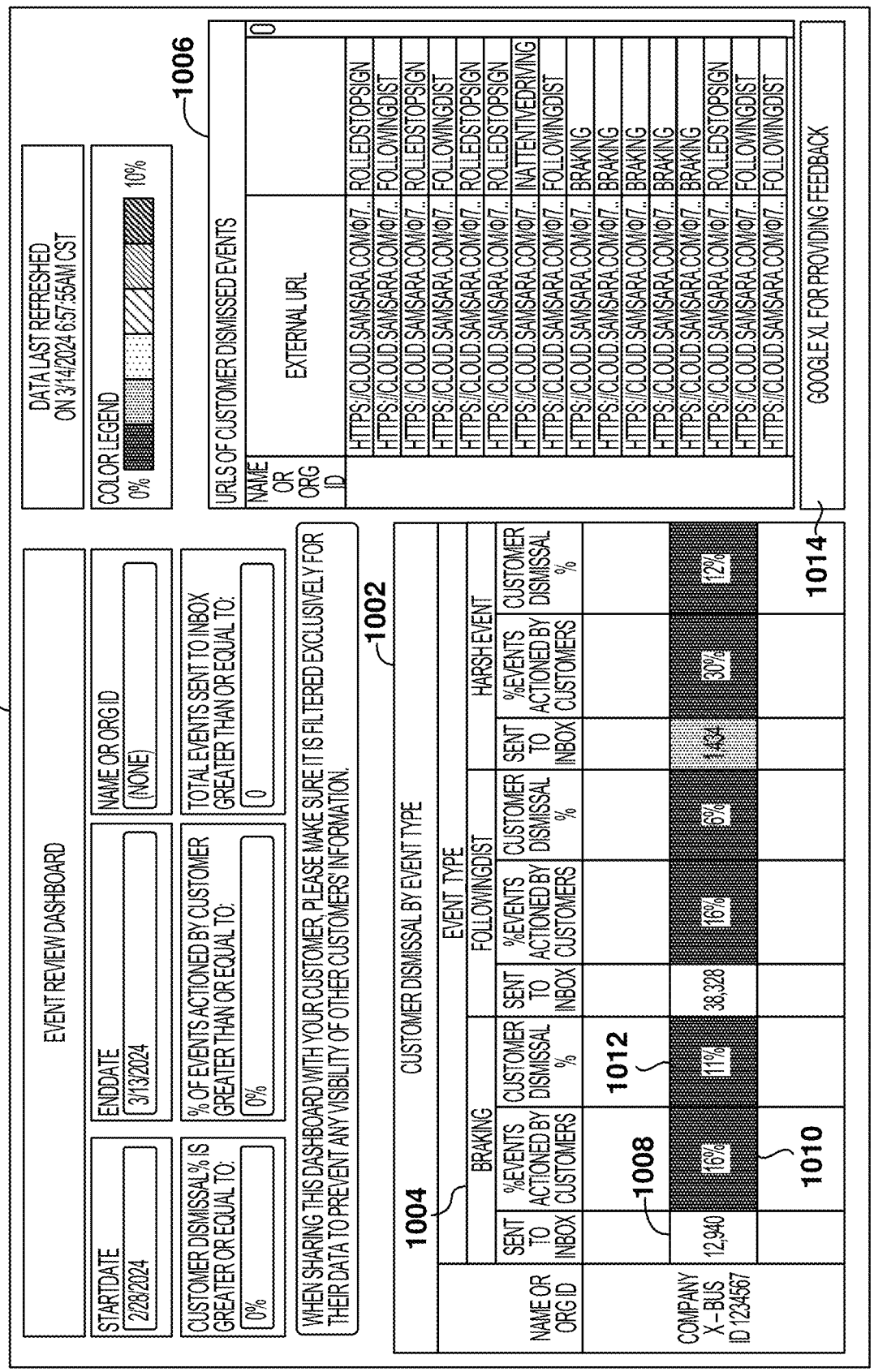
FIG. 10 shows sample values for the event review dashboard after applying filters.

FIG. 10 shows sample values for the event review dashboard after applying the filters. In the illustrated example, the user has selected "Company X—Bus" with Identifier (ID) 1234567. Further, the user has selected Jan. 1, 2024 as the start date and 3/13/204 as the end date. The remaining filters have not been activated.

At the bottom left of the UI 902, there is a table 1002 titled "Customer Dismissal by Event Type. The first column of the table 1002 includes the name of the organization, and in this example, there is only one entry for the selected customer ID.

Further, the table 1002 includes several columns in groups of three. Each group 1004 represents an event, such as breaking, following distance, harsh event, inattentive driving, no seat belt, rolled stop sign, and sharp turn. Other examples may result in the selection of other event types. If the user selects (e.g., clicks on) a specific column title, such as "braking," the UI will provide further details on that event type.

Each group 1004 includes three columns for three values: number sent to inbox 1008, percentage of events actioned by customers 1010 (the events that have been reviewed by the customers), and the customer dismissal rate 1012. The dismissal rate is the percentage of events reviewed that are dismissed as not true events.

For example, the first group 1004 shows values of 12,940 events sent to the inbox, 16 percent of events actioned by the customer, and 11 percent dismissal rate. This raises the question of how the customer is utilizing the events sent to their inbox and whether they are effectively incorporating them into their coaching program. In this example, 74% of the events are currently in the backlog, and of the events that have been sent to inboxes, 16% have been actioned. The backlog still contains a significant number of events that require review. The delay in acting on these events does not imply that they are not being utilized; rather, it indicates that the customer is slow in responding to them. The value of the information increases once the events are categorized into actionable buckets.

On the right side of the UI 902, there is a panel 1006 titled "URLs of customer dismissed Events" with the list of dismissed events, including a URL for review and the event type. If an event URL is selected, the UI will transition to the event review screen, such as the one illustrated in FIG. 1. This allows users to directly access the details of specific events that have been dismissed.

The layout and design of the UI 902 is optimized for ease of use, with a clear distinction between different sections and data points to facilitate quick comprehension and efficient analysis by the user.

During testing, feedback from customers revealed a widespread lack of awareness regarding their low action rate, with some customers realizing the need to establish or improve the coaching program to enhance driver behavior.

There is a feedback link 1014 provided in the bottom right corner of the UI 902, allowing users to submit feedback to the product team. This feedback is then used to enhance the settings and improve the AI model learning process.

Figure 11:
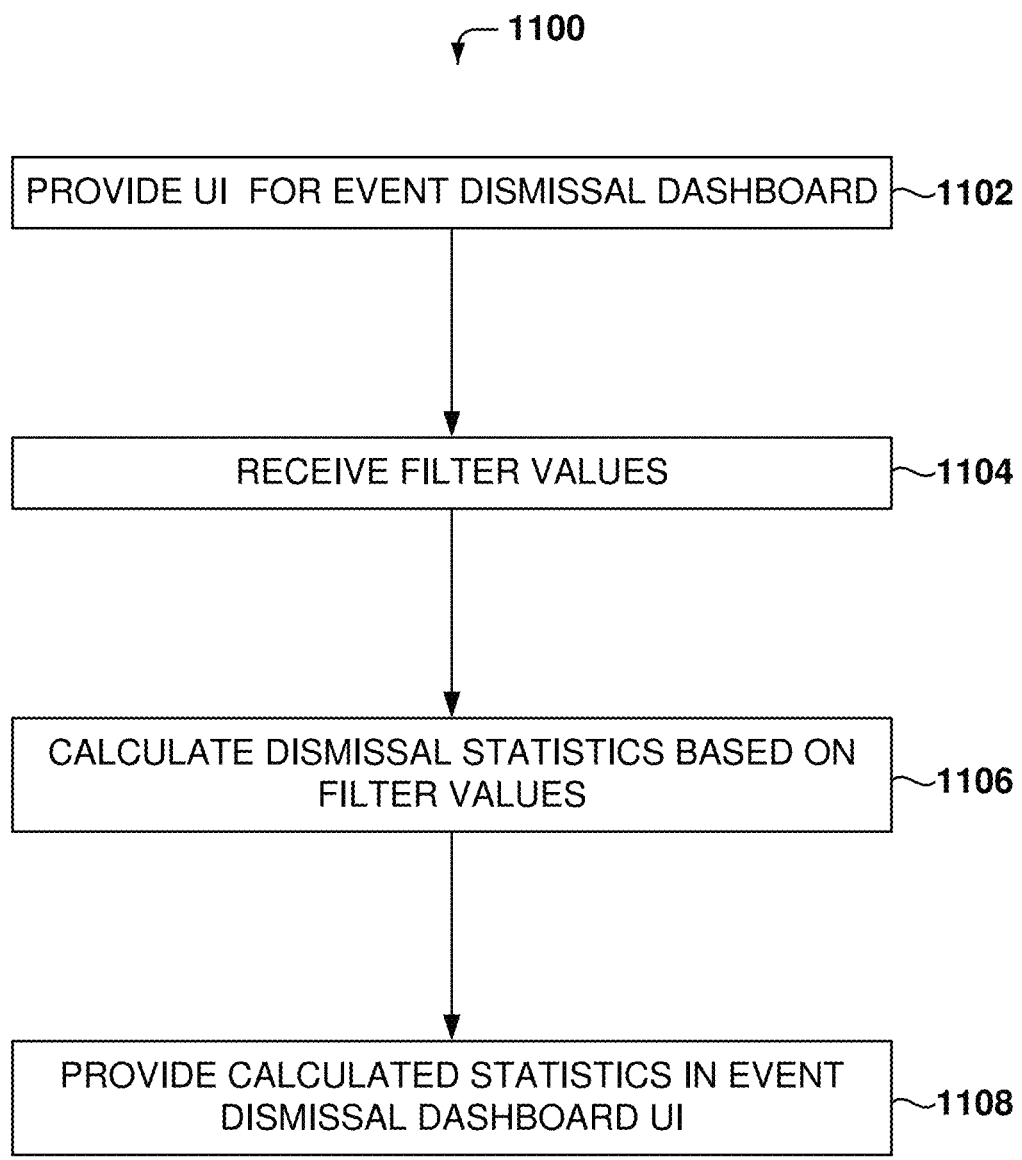
FIG. 11 is a flowchart of a method for calculating information for the event review dashboard, according to some examples.

FIG. 11 is a flowchart of a method 1100 for calculating information for the event review dashboard, according to some examples. While the various operations in this flowchart are presented and described sequentially, one of ordinary skill will appreciate that some or all of the operations may be executed in a different order, be combined or omitted, or be executed in parallel.

Operation 1102 involves providing a user interface (UI) for the event dismissal dashboard.

From operation 1102, the method 1100 flows to operation 1104, which entails receiving filter values. The filter values can include various parameters such as date ranges, event types, or dismissal rates relevant to the event review.

Once the filter values are received, the method 1100 progresses to operation 1106, where dismissal statistics are calculated based on the filter values provided. The dismissal statistics are calculated by identifying the events after the filtering and then determining how many events were sent to the safety inbox, what percentage of these events were actioned by the customer, and what percentage of these events were dismissed by the customer.

From operation 1106, the method 1100 flows to operation 1108, which involves providing the calculated statistics in the event dismissal dashboard UI.

Figure 12:
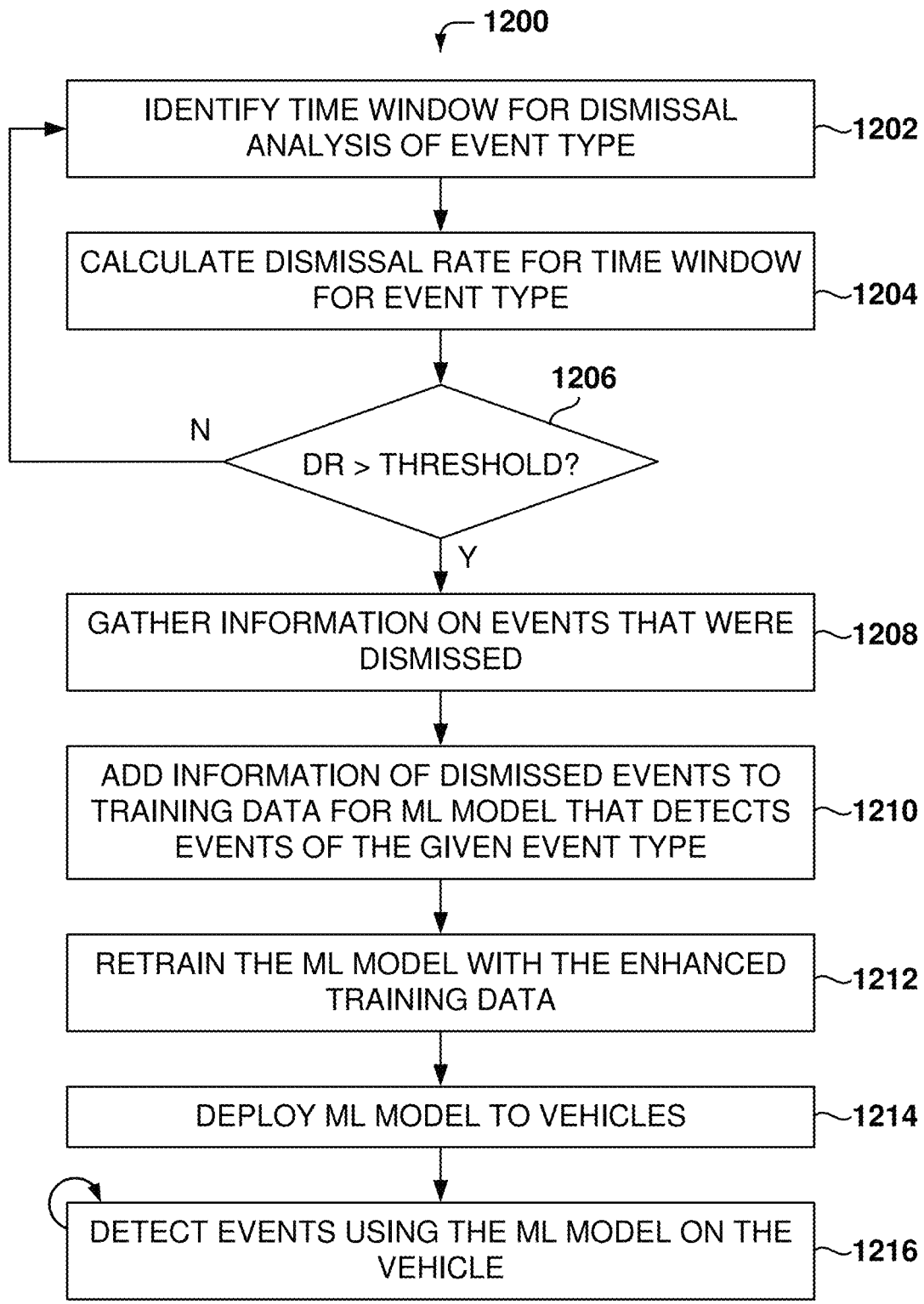
FIG. 12 is a flowchart of a method for improving ML model training data based on event reviews, according to some examples.

FIG. 12 is a flowchart of a method 1200 for improving ML model training data based on event reviews, according to some examples. While the various operations in this flowchart are presented and described sequentially, one of ordinary skill will appreciate that some or all of the operations may be executed in a different order, be combined or omitted, or be executed in parallel.

One objective of the proposed solution is to proactively identify the need to make adjustments and enhance the performance of the AI models. Detecting a perceived lack of value in these events by customers indicates potential issues with the generation of events, such as too many false events being triggered. The presented techniques proactively address such concerns by analyzing the feedback received from customers through the dashboard interface.

Operation 1202 involves identifying a time window for the dismissal analysis of a specific event type. This operation sets the temporal context within which event data will be analyzed.

From operation 1202, the method 1200 flows to operation 1204 to calculate the dismissal rate (DR) for the identified time window for the given event type. The DR quantifies the frequency at which events are dismissed within the specified time frame. Customers have the option to either submit, discard, or recognize the videos, and various coaching statuses can be applied in this process. The aim is to train the AI using this data to enhance the model and optimize the costs associated with managing customer accounts. Certain events, such as rolling stops or harsh braking, generate a significant volume of data regularly. Reviewing these events operationally (including review by the service provider and by the customer) requires substantial financial resources, and significant cost savings may be gained by decreasing the number of improperly triggered events.

From operation 1204, the method 1200 flows to operation 1206, which includes a decision point where the calculated DR is compared to a predefined threshold. If the DR exceeds the threshold, the method proceeds to operation 1208; otherwise, the method loops back to operation 1202 to reassess the time window or event type.

Operation 1208 involves gathering information on the dismissed events. This operation assists in understanding the characteristics of the events that the current ML model may not effectively handle.

From operation 1208, the method 1200 flows to operation 1210 for adding the information of dismissed events to the training data for the ML model that detects events of the given event type. This operation aims to incorporate real-world feedback into the training dataset to improve the model's accuracy.

Operation 1212 represents the retraining of the ML model with the enhanced training data. This operation is where the ML model is trained with the newly added information to recognize better and classify events.

Once the model is retrained, operation 1214 deploys the ML model to vehicles. This operation puts the improved model into practice, allowing the improved model to be used in a real-world environment.

From operation 1214, the method 1200 flows to operation 1216 for periodically detecting events using the new ML model on the vehicle. This is the operation where the effectiveness of the improved model is realized in the field, as it processes incoming data to identify events.

The logic behind the method 1200 is to create a feedback loop where real-world performance data (dismissal rates and dismissed event information) is used to refine the ML model continuously. This iterative process ensures that the model remains relevant and accurate over time.

The focus is on identifying non-coachable events at the customer level, which can provide insights into specific vehicles that may require further investigation due to different settings. The data collected can help in pinpointing vehicles with unique configurations that may need adjustments, possibly due to variations in the installation processes.

Using the gathered data to train the artificial intelligence system enables the BMS to incorporate customer behavior insights into the process of determining the type of videos to send to customers' inboxes.

Figure 13:
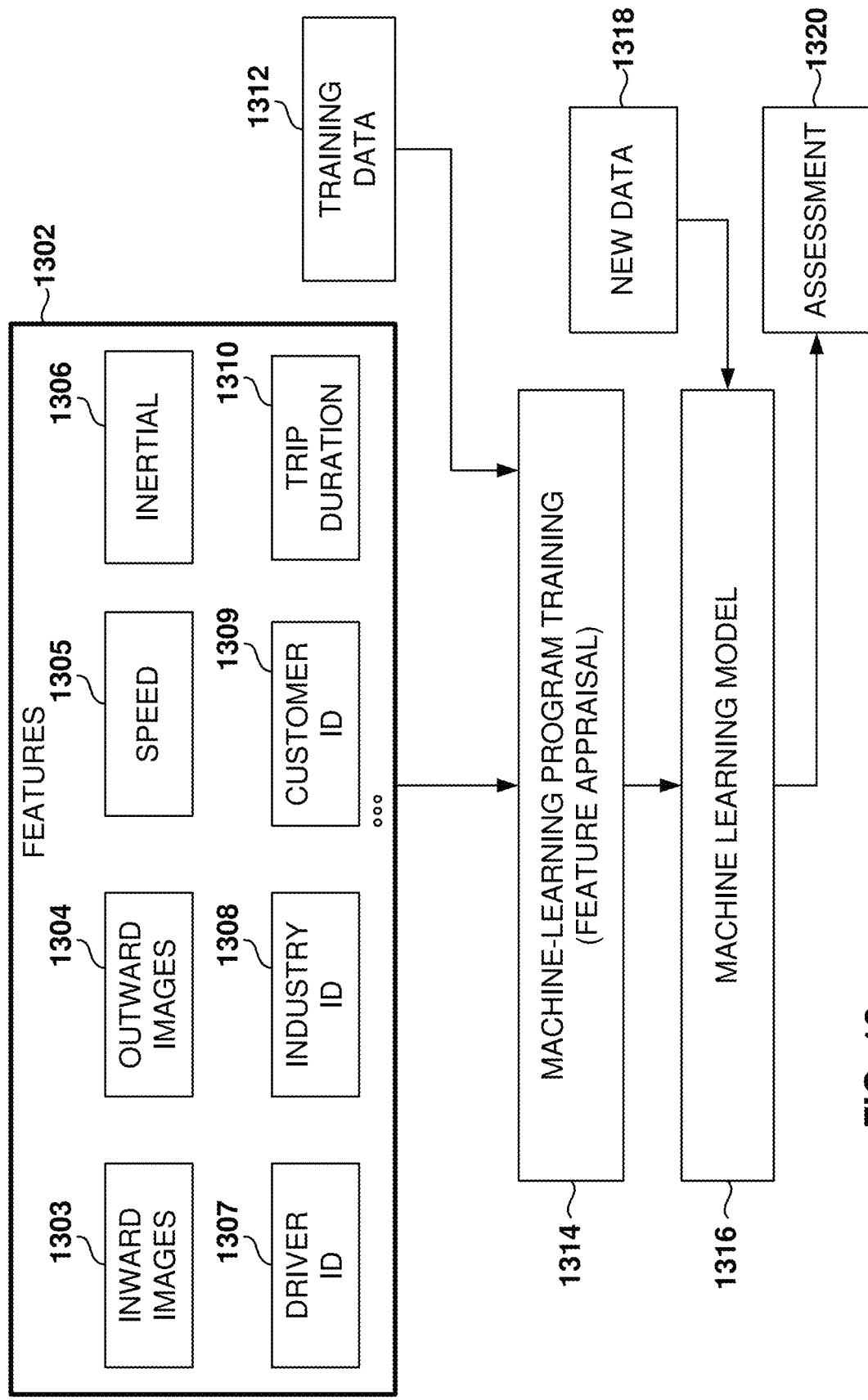
FIG. 13 illustrates the training and use of a machine-learning model, according to some example examples.

FIG. 13 illustrates the training and use of a machine-learning model 1316, according to some example examples. In some examples, machine learning (ML) models 1316 are utilized to perform operations associated with detecting CW events.

Machine Learning (ML) is an application that provides computer systems the ability to perform tasks without explicitly being programmed by making inferences based on patterns found in the analysis of data. Machine learning explores the study and construction of algorithms, also referred to herein as tools, that may learn from existing data and make predictions about new data. Such machine-learning algorithms operate by building an ML model 1316 from training data 1312 in order to make data-driven predictions or decisions expressed as outputs or assessments 1320. Although examples are presented with respect to a few machine-learning tools, the principles presented herein may be applied to other machine-learning tools.

Data representation refers to the method of organizing the data for storage on a computer system, including the structure for the identified features and their values. In ML, it is typical to represent the data in vectors or matrices of two or more dimensions. When dealing with large amounts of data and many features, data representation is essential so that the training is able to identify the correlations within the data.

In some examples, collision warning events (CW) are detected. The images captured by the outward camera are embedded into vectors. A plurality of images (e.g., ten images) is used to estimate the occurrence of collision warning events. The images are sampled from the video by choosing a number of frames each second (e.g., two frames per second, six frames per second) for the analysis for a predetermined number of seconds (e.g., 1.5 seconds, 2 seconds). In some examples, six frames are used per second for the last 1.66 seconds, but other sampling frequencies and time windows may be used. Estimating CD events is calculated periodically, such as six times a second twice a second, but other calculating frequencies may also be used. In other examples, other ML models are used to detect other types of events, such as harsh braking, inattentive driving, etc.

There are two common modes for ML: supervised ML and unsupervised ML. Supervised ML uses prior knowledge (e.g., examples that correlate inputs to outputs or outcomes) to learn the relationships between the inputs and the outputs. The goal of supervised ML is to learn a function that, given some training data, best approximates the relationship between the training inputs and outputs so that the ML model can implement the same relationships when given inputs to generate the corresponding outputs. Unsupervised ML is the training of an ML algorithm, using information that is neither classified nor labeled and allowing the algorithm to act on that information without guidance. Unsupervised ML is useful in exploratory analysis because it can automatically identify structure in data.

Typical tasks for supervised ML are classification problems and regression problems. Classification problems, also referred to as categorization problems, aim to classify items into one of several category values (for example, is this object an apple or an orange?). Regression algorithms aim to quantify some items (for example, by providing a score to the value of some input). Some examples of commonly used supervised ML algorithms are Logistic Regression (LR), Naive-Bayes, Random Forest (RF), neural networks (NN), deep neural networks (DNN), matrix factorization, and Support Vector Machines (SVM).

Some typical tasks for unsupervised ML include clustering, representation learning, and density estimation. Some examples of commonly used unsupervised ML algorithms are K-means clustering, principal component analysis, and autoencoders. In some examples, ML model 1316 outputs a value that is the probability of a collision within a predetermined period of time (e.g., 2.5 seconds). In other examples, ML model 1316 outputs two values corresponding to the probability of a collision and the probability of not having a collision. For other types of events, the ML model may output other values, such as the probability that the event of the corresponding type has occurred.

The training data 1312 comprises examples of values for the features 1302. In some examples, the training data comprises labeled data with examples of values for the features 1302 and labels indicating the outcome, such as collision occurred or collision did not occur. The machine-learning algorithms utilize the training data 1312 to find correlations among identified features 1302 that affect the outcome.

In some examples, the training data 1312 includes data for true positive events, such as videos or images of collisions, distracted driving or mobile phone usage events followed by a harsh change in IMU/accelerometer, emergency events like harsh braking, etc. Other training data may include true false events, such as videos or images of events without a threat of collision, absence of emergency events, no sudden changes in IMU data, etc. In some examples, the training data 1312 includes labels created by human judges to note if the video corresponded to a CW event.

A feature 1302 is an individual measurable property of a phenomenon being observed. The concept of a feature is related to that of an explanatory variable used in statistical techniques such as linear regression. Choosing informative, discriminating, and independent features is essential for the effective operation of ML in pattern recognition, classification, and regression. Features may be of different types, such as numeric, strings, categorical, and graph. A categorical feature is a feature that may be assigned a value from a plurality of predetermined possible values (e.g., this animal is a dog, a cat, or a bird).

The more accurate the training data, the more accurate ML model 1316 will be. Further, according to some examples, a large number of images, such as images from 15,000 videos, are used for the training.

In one example, the features 1302 may be of different types and may include one or more of outward images 1303 from outward videos, inward images 1304 of the cabin, speed 1305, inertial measurements 1306, driver identifier 1307 (ID), industry ID 1308, customer ID 1309, trip duration 1310, etc.

During training 1314, the ML program, also referred to as ML algorithm or ML tool, analyzes the training data 1312 based on identified features 1302 and configuration parameters defined for the training. The result of the training 1314 is the ML model 1316, which is capable of taking inputs to produce assessments.

Training an ML algorithm involves analyzing large amounts of data (e.g., from several gigabytes to a terabyte or more) in order to find data correlations. The ML algorithms utilize the training data 1312 to find correlations among the identified features 1302 that affect the outcome or assessment 1320. In some examples, the training data 1312 includes labeled data, which is known data for one or more identified features 1302 and one or more outcomes, such as the calculation of the CW probability.

The ML algorithms usually explore many possible functions and parameters before finding what the ML algorithms identify to be the best correlations within the data; therefore, training may make use of large amounts of computing resources and time.

When the ML model 1316 is used to perform an assessment, new data 1318 is provided as input to the ML model 1316, and the ML model 1316 generates the assessment 1320 as output. For example, the input includes feature vectors for the most recent set of images sampled from the video (e.g., outward frames), and the ML model 1316 calculates the CW probability.

In some examples, results obtained by the model 1316 during operation (e.g., assessment 1320 produced by the model in response to inputs) are used to improve the training data 1312, which is then used to generate a newer version of the model. Thus, a feedback loop is formed to use the results obtained by the model to improve the model. In some examples, the ML program is one of a Residual Network (ResNet) model or a video transformer, but other examples may utilize other types of models.

Feature extraction is a process that reduces the amount of resources required to describe a large set of data. When performing analysis of complex data, one of the major problems stems from the number of variables involved. Analysis with a large number of variables generally requires a large amount of memory and computational power, and it may cause a classification algorithm to overfit training samples and generalize poorly to new samples. Feature extraction includes constructing combinations of variables to get around these large-data-set problems while still describing the data with sufficient accuracy for the desired purpose.

In some examples, feature extraction starts from an initial set of measured data and builds derived values (features) intended to be informative and non-redundant, facilitating the subsequent learning and generalization steps. Further, feature extraction is related to dimensionality reduction, such as reducing large vectors (sometimes with very sparse data) to smaller vectors capturing the same or a similar amount of information.

The improvement in the quality of the ML model 1316 to estimate the occurrence of events will result in benefits for the service provider and the end customer. The service provider benefits because of the reduction in false positives with a more accurate model, and the fewer false positives, the less time has to be spent on reviewers to review the CW events. Similarly, the end customer will benefit when fewer CW events need to be reviewed by the reduction of false positives.

Figure 14:
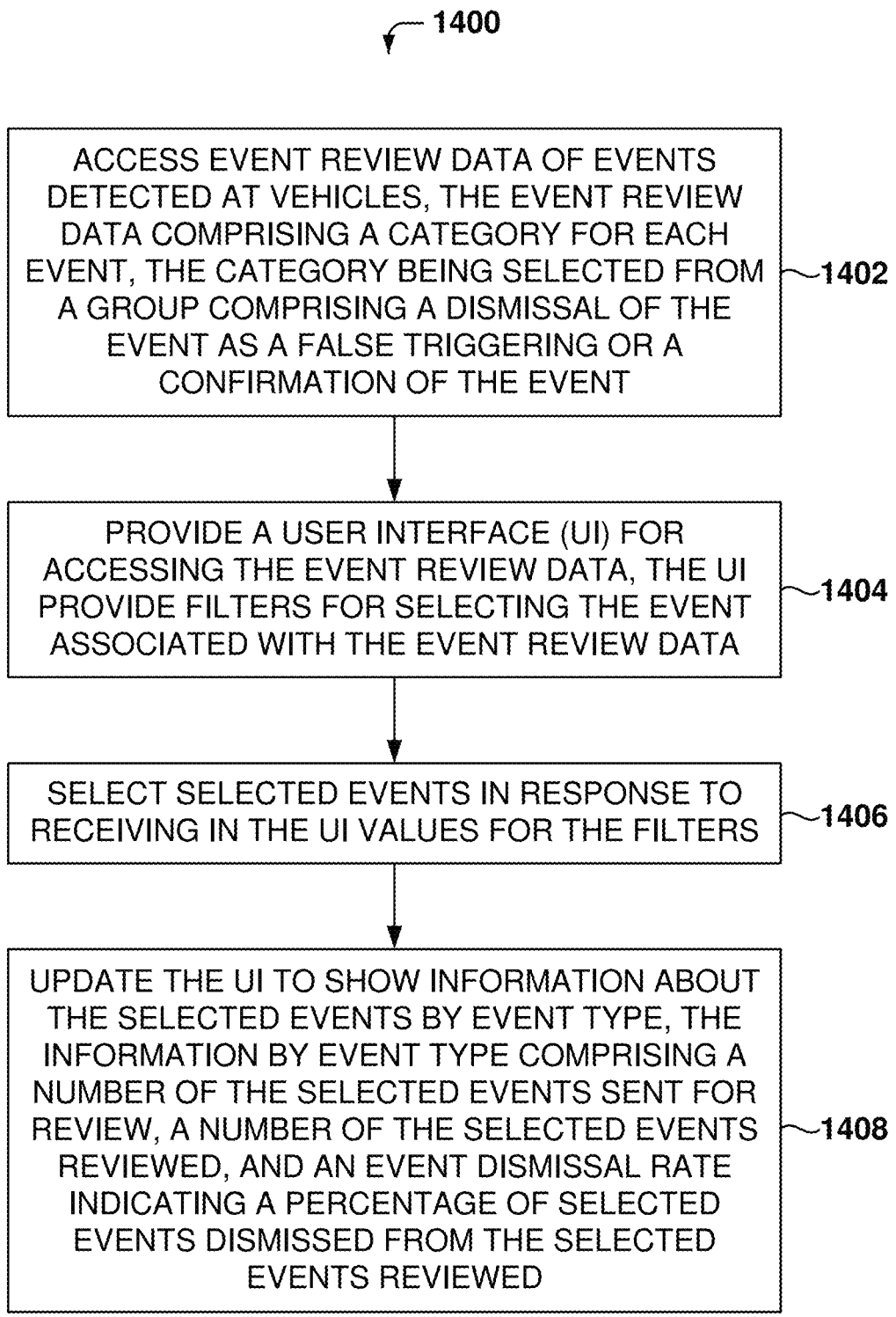
FIG. 14 is a flowchart of a method for providing an event review dashboard that shows event dismissal information, according to some examples.

FIG. 14 is a flowchart of a method 1400 for providing an event review dashboard that shows event dismissal information, according to some examples. While the various operations in this flowchart are presented and described sequentially, one of ordinary skill will appreciate that some or all of the operations may be executed in a different order, be combined or omitted, or be executed in parallel.

Operation 1402 is for accessing event review data of events detected at vehicles. The event review data comprises a category for each event, and the category is selected from a group comprising a dismissal of the event as a false triggering or a confirmation of the event.

From operation 1402, the method 1400 flows to operation 1404 to provide a user interface (UI) for accessing the event review data, where the UI provides filters for selecting the event associated with the event review data.

From operation 1404, the method 1400 flows to operation 1406 for selecting selected events in response to receiving in the UI values for the filters.

From operation 1406, the method 1400 flows to operation 1408 for updating the UI to show information about the selected events by event type. The information by event type comprises a number of the selected events sent for review, a number of the selected events reviewed, and an event dismissal rate indicating a percentage of selected events dismissed from the selected events reviewed.

In some examples, the event types comprise harsh braking, following too close, harsh turn, inattentive driving, no seat belt, and speeding.

In some examples, a first type of event is detected by a machine learning (ML) model executing at a device in a vehicle.

In some examples, the method 1400 further comprises collecting events of the first type that were dismissed and adding information on the collected events to training data for retraining the ML model that executes at the vehicle.

In some examples, the filters comprise a start date filter and an end date filter to identify a time range for selecting the events.

In some examples, the filters comprise a customer dismissal percentage filter to select events with a dismissal rate above an input value for the customer dismissal percentage filter.

In some examples, the filters comprise a filter for a percentage of events action by customer greater than or equal to a corresponding input value.

In some examples, the filters comprise a filter for total events sent for review is greater than or equal to a corresponding input value.

In some examples, the UI includes a panel listing the selected events, where selecting one of the events in the panel will cause the presentation of a review UI for reviewing the event.

In some examples, a device in the vehicle includes an inward camera and an outward camera, wherein events are detected by the device in the vehicle based on images from the inward camera or the outward camera.

Another general aspect is for a system that includes a memory comprising instructions and one or more computer processors. The instructions, when executed by the one or more computer processors, cause the one or more computer processors to perform operations comprising: accessing event review data of events detected at vehicles, the event review data comprising a category for each event, the category being selected from a group comprising a dismissal of the event as a false triggering or a confirmation of the event; provide a user interface (UI) for accessing the event review data, the UI providing filters for selecting the event associated with the event review data; selecting selected events in response to receiving in the UI values for the filters; and updating the UI to show information about the selected events by event type, the information by event type comprising a number of the selected events sent for review, a number of the selected events reviewed, and an event dismissal rate indicating a percentage of selected events dismissed from the selected events reviewed.

In yet another general aspect, a tangible machine-readable storage medium (e.g., a non-transitory storage medium) includes instructions that, when executed by a machine, cause the machine to perform operations comprising: accessing event review data of events detected at vehicles, the event review data comprising a category for each event, the category being selected from a group comprising a dismissal of the event as a false triggering or a confirmation of the event; provide a user interface (UI) for accessing the event review data, the UI providing filters for selecting the event associated with the event review data; selecting selected events in response to receiving in the UI values for the filters; and updating the UI to show information about the selected events by event type, the information by event type comprising a number of the selected events sent for review, a number of the selected events reviewed, and an event dismissal rate indicating a percentage of selected events dismissed from the selected events reviewed.

Figure 15:
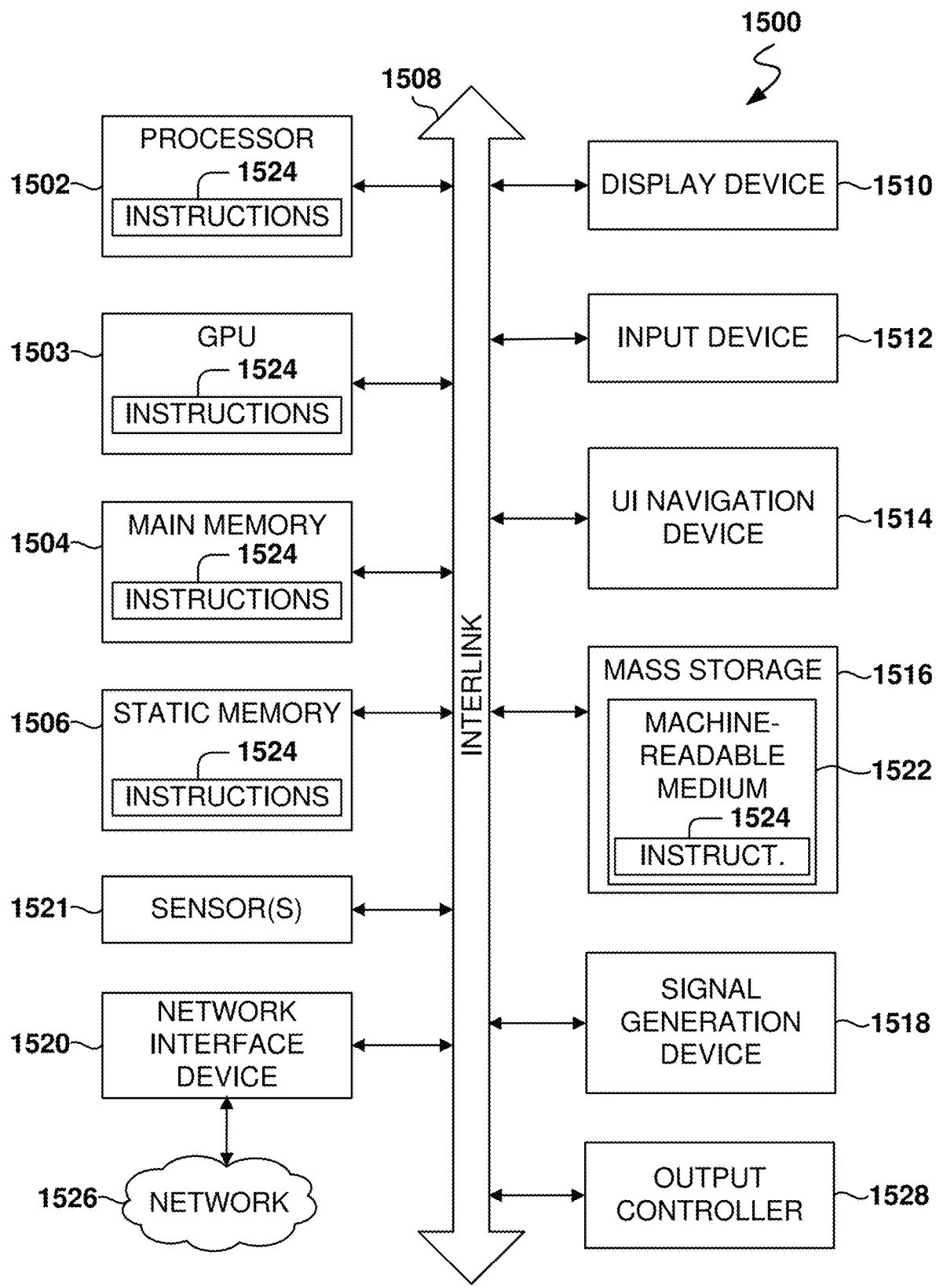
FIG. 15 is a block diagram illustrating an example of a machine upon or by which one or more example process examples described herein may be implemented or controlled.

FIG. 15 is a block diagram illustrating an example of a machine 1500 upon or by which one or more example process examples described herein may be implemented or controlled. In alternative examples, the machine 1500 may operate as a standalone device or be connected (e.g., networked) to other machines. In a networked deployment, the machine 1500 may operate in the capacity of a server machine, a client machine, or both in server-client network environments. In an example, the machine 1500 may act as a peer machine in a peer-to-peer (P2P) (or other distributed) network environment. Further, while only a single machine 1500 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, various components, or mechanisms. Circuitry is a collection of circuits implemented in tangible entities, including hardware (e.g., simple circuits, gates, logic). Circuitry membership may be flexible over time and underlying hardware variability. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits), including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other circuitry components when the device operates. In an example, any of the physical components may be used in more than one member of more than one circuitry. For example, under operation, execution units may be used in a first circuit of a first circuitry at one point in time and reused by a second circuit in the first circuitry or by a third circuit in a second circuitry at a different time.

The machine 1500 (e.g., computer system) may include a hardware processor 1502 (e.g., a central processing unit (CPU), a hardware processor core, or any combination thereof), a graphics processing unit (GPU 1503), a main memory 1504, and a static memory 1506, some or all of which may communicate with each other via an interlink 1508 (e.g., bus). The machine 1500 may further include a display device 1510, an alphanumeric input device 1512 (e.g., a keyboard), and a user interface (UI) navigation device 1514 (e.g., a mouse). In an example, the display device 1510, alphanumeric input device 1512, and UI navigation device 1514 may be a touch screen display. The machine 1500 may additionally include a mass storage device 1516 (e.g., drive unit), a signal generation device 1518 (e.g., a speaker), a network interface device 1520, and one or more sensors 1521, such as a Global Positioning System (GPS) sensor, compass, accelerometer, or another sensor. The machine 1500 may include an output controller 1528, such as a serial (e.g., universal serial bus (USB)), parallel, or other wired or wireless (e.g., infrared (IR), near field communication (NFC)) connection to communicate with or control one or more peripheral devices (e.g., a printer, card reader).

The processor 1502 refers to any one or more circuits or virtual circuits (e.g., a physical circuit emulated by logic executing on an actual processor) that manipulates data values according to control signals (e.g., commands, opcodes, machine code, control words, macroinstructions, etc.) and which produces corresponding output signals that are applied to operate a machine. A processor 1502 may, for example, include at least one of a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), a Tensor Processing Unit (TPU), a Neural Processing Unit (NPU), a Vision Processing Unit (VPU), a Machine Learning Accelerator, an Artificial Intelligence Accelerator, an Application Specific Integrated Circuit (ASIC), a Field Programmable Gate Array (FPGA), a Radio-Frequency Integrated Circuit (RFIC), a Neuromorphic Processor, a Quantum Processor, or any combination thereof.

The processor 1502 may further be a multi-core processor having two or more independent processors (sometimes referred to as "cores") that may execute instructions contemporaneously. Multi-core processors contain multiple computational cores on a single integrated circuit die, each of which can independently execute program instructions in parallel. Parallel processing on multi-core processors may be implemented via architectures like superscalar, VLIW, vector processing, or SIMD that allow each core to run separate instruction streams concurrently. The processor 1502 may be emulated in software, running on a physical processor, as a virtual processor or virtual circuit. The virtual processor may behave like an independent processor but is implemented in software rather than hardware.

The mass storage device 1516 may include a machine-readable medium 1522 on which one or more sets of data structures or instructions 1524 (e.g., software) embodying or utilized by any of the techniques or functions described herein. The instructions 1524 may also reside, completely or at least partially, within the main memory 1504, within the static memory 1506, within the hardware processor 1502, or the GPU 1503 during execution thereof by the machine 1500. For example, one or any combination of the hardware processor 1502, the GPU 1503, the main memory 1504, the static memory 1506, or the mass storage device 1516 may constitute machine-readable media.

While the machine-readable medium 1522 is illustrated as a single medium, the term "machine-readable medium" may include a single medium or multiple media (e.g., a centralized or distributed database and associated caches and servers) configured to store one or more instructions 1524.

The term "machine-readable medium" may include any medium that is capable of storing, encoding, or carrying instructions 1524 for execution by the machine 1500 and that causes the machine 1500 to perform any one or more of the techniques of the present disclosure or that is capable of storing, encoding, or carrying data structures used by or associated with such instructions 1524. Non-limiting machine-readable medium examples may include solid-state memories and optical and magnetic media. For example, a massed machine-readable medium comprises a machine-readable medium 1522 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM) and flash memory devices; magnetic disks, such as internal hard disks and removable disks; magneto-optical disks; and CD-ROM and DVD-ROM disks.

The instructions 1524 may be transmitted or received over a communications network 1526 using a transmission medium via the network interface device 1520.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented separately. These and other variations, modifications, additions, and improvements fall within the scope of the subject matter herein.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

Additionally, as used in this disclosure, phrases of the form "at least one of an A, a B, or a C," "at least one of A, B, and C," and the like should be interpreted to select at least one from the group that comprises "A, B, and C." Unless explicitly stated otherwise in connection with a particular instance, in this disclosure, this manner of phrasing does not mean "at least one of A, at least one of B, and at least one of C." As used in this disclosure, the example "at least one of an A, a B, or a C" would cover any of the following selections: {A}, {B}, {C}, {A, B}, {A, C}, {B, C}, and {A, B, C}.

Moreover, plural instances may be provided for resources, operations, or structures described herein as a single instance. Additionally, boundaries between various resources, operations, modules, engines, and data stores are somewhat arbitrary, and particular operations are illustrated in the context of specific illustrative configurations. Other allocations of functionality are envisioned and may fall within the scope of various examples of the present disclosure. In general, structures and functionality are presented as separate resources in the example; configurations may be implemented as a combined structure or resource. Similarly, structures and functionality presented as a single resource may be implemented as separate resources. These and other variations, modifications, additions, and improvements fall within a scope of examples of the present disclosure as represented by the appended claims. Accordingly, the specification and drawings are to be regarded in an illustrative rather than a restrictive sense.

What is claimed is:

1. A computer-implemented method comprising:
    accessing event review data of events detected at vehicles, the event review data comprising a category for each event, the category being selected from a group comprising a dismissal of the event as a false triggering or a confirmation of the event;
    provide a user interface (UI) for accessing the event review data, the UI providing filters for selecting the event associated with the event review data;
    selecting selected events in response to receiving in the UI values for the filters;
    updating the UI to show information about the selected events by event type, the information by event type comprising a number of the selected events sent for review, a number of the selected events reviewed, and an event dismissal rate indicating a percentage of selected events dismissed from the selected events reviewed;
    collecting events of a first type of event that were dismissed; and
    adding information on the collected events to training data for retraining a machine learning (ML) model that executes at a vehicle;
    wherein the first type of event is detected by the ML model executing at a device in the vehicle.

2. The method as recited in claim 1, wherein the event types comprise harsh braking, following too close, harsh turn, inattentive driving, no seat belt, and speeding.

3. The method as recited in claim 1, wherein the filters comprise a start date filter and an end date filter to identify a time range for selecting the events.

4. The method as recited in claim 1, wherein the filters comprise a customer dismissal percentage filter to select events with a dismissal rate above an input value for the customer dismissal percentage filter.

5. The method as recited in claim 1, wherein the filters comprise a filter for a percentage of events action by customer greater than or equal to a corresponding input value.

6. The method as recited in claim 1, wherein the filters comprise a filter for total events sent for review are greater than or equal to a corresponding input value.

7. The method as recited in claim 1, wherein the UI includes a panel listing the selected events, wherein selecting one of the events in the panel will cause presentation of a review UI for reviewing the event.

8. The method as recited in claim 1, wherein a device in the vehicle includes an inward camera and an outward camera, wherein events are detected by the device in the vehicle based on images from the inward camera or the outward camera.

9. A system comprising:
a memory comprising instructions; and
one or more computer processors, wherein the instructions, when
executed by the one or more computer processors, cause the system to perform operations comprising:
accessing event review data of events detected at vehicles, the event review data comprising a category for each event, the category being selected from a group comprising a dismissal of the event as a false triggering or a confirmation of the event;
provide a user interface (UI) for accessing the event review data, the UI providing filters for selecting the event associated with the event review data;
selecting selected events in response to receiving in the UI values for the filters;
updating the UI to show information about the selected events by event type, the information by event type comprising a number of the selected events sent for review, a number of the selected events reviewed, and an event dismissal rate indicating a percentage of selected events dismissed from the selected events reviewed;
collecting events of a first type of event that were dismissed; and
adding information on the collected events to training data for retraining a machine learning (ML) model that executes at a vehicle;
wherein the first type of event is detected by the ML model executing at a device in the vehicle.

10. The system as recited in claim 9, wherein the event types comprise harsh braking, following too close, harsh turn, inattentive driving, no seat belt, and speeding.

11. The system as recited in claim 9, wherein the filters comprise a start date filter and an end date filter to identify a time range for selecting the events.

12. A non-transitory machine-readable storage medium including instructions that, when executed by a machine, cause the machine to perform operations comprising:
accessing event review data of events detected at vehicles, the event review data comprising a category for each event, the category being selected from a group comprising a dismissal of the event as a false triggering or a confirmation of the event;
provide a user interface (UI) for accessing the event review data, the Ul providing filters for selecting the event associated with the event review data;
selecting selected events in response to receiving in the UI values for the filters;
updating the UI to show information about the selected events by event type, the information by event type comprising a number of the selected events sent for review, a number of the selected events reviewed, and an event dismissal rate indicating a percentage of selected events dismissed from the selected events reviewed;
collecting events of a first type of event that were dismissed; and
adding information on the collected events to training data for retraining a machine learning (ML) model that executes at a vehicle;
wherein the first type of event is detected by the ML model executing at a device in the vehicle.

13. The non-transitory machine-readable storage medium as recited in claim 12, wherein the event types comprise harsh braking, following too close, harsh turn, inattentive driving, no seat belt, and speeding.

14. The non-transitory machine-readable storage medium as recited in claim 12, wherein the filters comprise a start date filter and an end date filter to identify a time range for selecting the events.

* * * * *

UNITED STATES PATENT AND TRADEMARK OFFICE
CERTIFICATE OF CORRECTION

| | |
|---|---|
| PATENT NO. | : 12,175,773 B1 |
| APPLICATION NO. | : 18/670365 |
| DATED | : December 24, 2024 |
| INVENTOR(S) | : Suryakant Kaushik |

It is certified that error appears in the above-identified patent and that said Letters Patent is hereby corrected as shown below:

In the Specification

In Column 17, Line 11, delete "1303" and insert --1304-- therefor

In Column 17, Line 12, delete "1304" and insert --1303-- therefor

In the Claims

In Column 24, Line 21, in Claim 12 delete "Ul" and insert --UI-- therefor

Signed and Sealed this
Twenty-fifth Day of February, 2025

Coke Morgan Stewart
*Acting Director of the United States Patent and Trademark Office*